United States Patent
Cho et al.

(10) Patent No.: US 10,114,542 B2
(45) Date of Patent: Oct. 30, 2018

(54) METHOD FOR CONTROLLING FUNCTION AND ELECTRONIC DEVICE THEREOF

(71) Applicant: Samsung Electronics Co., Ltd., Suwon-si, Gyeonggi-do (KR)

(72) Inventors: Eun-Hee Cho, Suwon-si (KR); Seung-Eun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 14/694,656

(22) Filed: Apr. 23, 2015

(65) Prior Publication Data

US 2016/0026322 A1    Jan. 28, 2016

(30) Foreign Application Priority Data

Jul. 24, 2014    (KR) .................... 10-2014-0094204

(51) Int. Cl.
*G06F 3/0488*    (2013.01)

(52) U.S. Cl.
CPC ........ *G06F 3/0488* (2013.01); *G06F 3/04883* (2013.01); *G06F 2203/04808* (2013.01)

(58) Field of Classification Search
CPC .............. G06F 3/0488; G06F 3/04883; G06F 2203/04808
See application file for complete search history.

(56) References Cited

U.S. PATENT DOCUMENTS

| | | | |
|---|---|---|---|
| 8,204,547 B2 | 6/2012 | Jang | |
| 8,407,606 B1* | 3/2013 | Davidson | G06F 3/0488 345/173 |
| 8,704,776 B2 | 4/2014 | Kim | |
| 9,275,244 B2* | 3/2016 | Nakaizawa | G06F 3/0488 |
| 9,304,670 B2* | 4/2016 | Cho | G06F 3/04845 |
| 9,411,463 B2* | 8/2016 | Miyano | G06F 3/04883 |
| 9,612,675 B2* | 4/2017 | Delattre | G06F 3/0414 |
| 9,871,664 B2* | 1/2018 | Yoon | H04L 9/3271 |
| 2006/0170562 A1 | 8/2006 | Choi et al. | |
| 2008/0168403 A1* | 7/2008 | Westerman | G06F 3/04883 715/863 |
| 2009/0309842 A1* | 12/2009 | Hung | G06F 3/011 345/173 |
| 2010/0251112 A1* | 9/2010 | Hinckley | G06F 3/0483 715/702 |
| 2011/0074703 A1* | 3/2011 | Black | G06F 3/0426 345/173 |
| 2012/0154447 A1* | 6/2012 | Kim | G06F 3/04883 345/661 |
| 2012/0256880 A1* | 10/2012 | Han | G06F 3/041 345/175 |

(Continued)

FOREIGN PATENT DOCUMENTS

| | | |
|---|---|---|
| KR | 2000-0017915 A | 4/2000 |
| KR | 20-0333701 Y1 | 11/2003 |

(Continued)

*Primary Examiner* — Jason C Olson
(74) *Attorney, Agent, or Firm* — Jefferson IP Law, LLP

(57) ABSTRACT

A method for operating of an electronic device is provided. The method includes detecting a palm touch on a touch screen of the electronic device while performing a first function of the electronic device, and performing a second function of the electronic device based on the detected palm touch on the touch screen of the electronic device.

18 Claims, 22 Drawing Sheets

(56) References Cited

U.S. PATENT DOCUMENTS

| | | | | |
|---|---|---|---|---|
| 2013/0009907 A1* | 1/2013 | Rosenberg | ............ | G06F 3/046 345/174 |
| 2013/0257777 A1* | 10/2013 | Benko | ................ | G06F 3/03545 345/173 |
| 2013/0300696 A1* | 11/2013 | Haran | .................... | G06F 3/041 345/173 |
| 2014/0062892 A1* | 3/2014 | Dickinson | ............ | G06F 3/0412 345/173 |
| 2014/0210742 A1* | 7/2014 | Delattre | ............ | G06F 3/04883 345/173 |
| 2014/0210797 A1* | 7/2014 | Kreek | .................. | G06F 3/0488 345/179 |
| 2015/0130737 A1* | 5/2015 | Im | ........................ | G06F 1/3265 345/173 |
| 2015/0309601 A1* | 10/2015 | Izumi | ................ | G06F 3/04842 345/173 |

FOREIGN PATENT DOCUMENTS

| | | |
|---|---|---|
| KR | 10-2006-0088275 A | 8/2006 |
| KR | 10-2007-0067297 A | 6/2007 |
| KR | 10-2009-0096833 A | 9/2009 |
| KR | 10-2012-0079214 A | 7/2012 |

\* cited by examiner

US 10,114,542 B2

METHOD FOR CONTROLLING FUNCTION AND ELECTRONIC DEVICE THEREOF

CROSS-REFERENCE TO RELATED APPLICATION(S)

This application claims the benefit under 35 U.S.C. § 119(a) of a Korean patent application filed on Jul. 24, 2014 in the Korean Intellectual Property Office and assigned Ser. No. 10-2014-0094204, the entire disclosure of which is hereby incorporated by reference.

TECHNICAL FIELD

The present disclosure relates to a method for controlling a function and an electronic device thereof.

BACKGROUND

With the development of information and communication technology and semiconductor technology, various electronic devices are developing into multimedia devices which provide various multimedia services. For example, an electronic device may provide various multimedia services such as a messenger service, a broadcasting service, a wireless Internet service, a camera service, and a music replay service.

As touch screen technology is applied to the electronic devices, preference for touch screen-based electronic devices increases. The touch screen-based electronic device may detect a touch which is input by a user's finger or an input pen such as a stylus and simultaneously display various multimedia contents on a display screen. In addition, as many users desire the electronic device with a larger screen, the size of the touch screen-based electronic device increases and thus the content displayed on the large screen becomes larger.

The above information is presented as background information only to assist with an understanding of the present disclosure. No determination has been made, and no assertion is made, as to whether any of the above might be applicable as prior art with regard to the present disclosure.

SUMMARY

As the screen of the electronic device becomes larger, the electronic device also magnifies private information or important information (e.g., personal information, a card password, and the like) to fit to the large screen. The display of the large screen does not meet the user's desire to avoid leak of sensitive information, and may cause problems such as invasion of privacy or leak of personal information.

Aspects of the present disclosure are to address at least the above-mentioned problems and/or disadvantages and to provide at least the advantages described below. Accordingly, an aspect of the present disclosure is to provide a method for controlling a function, which can prevent invasion of privacy caused by leak of private information, and an electronic device thereof.

Another aspect of the present disclosure is to provide a method for controlling a function, which can prevent leak of personal information caused by input of personal information, and an electronic device thereof.

Another aspect of the present disclosure is to provide a method for controlling a function, which provides a user interface to perform an alternative function pre-set by using a gesture, and an electronic device thereof.

In accordance with an aspect of the present disclosure, a method for operating of an electronic device is provided. The method includes detecting a palm touch while performing a first function, and performing a second function according to the detected palm touch.

In accordance with another aspect of the present disclosure, an electronic device is provided. The electronic device includes a touch screen configured to detect a palm touch, and a processor configured to perform a second function according to the detected palm touch while performing a first function of the electronic device.

A method for controlling a function and an electronic device thereof according to various embodiments of the present disclosure can prevent invasion of privacy caused by leak of private information. A method for controlling a function and an electronic device thereof according to various embodiments of the present disclosure can prevent leak of personal information caused by input of personal information. A method for controlling a function and an electronic device thereof according to various embodiments of the present disclosure can provide a user interface to perform an alternative function pre-set by using a gesture.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
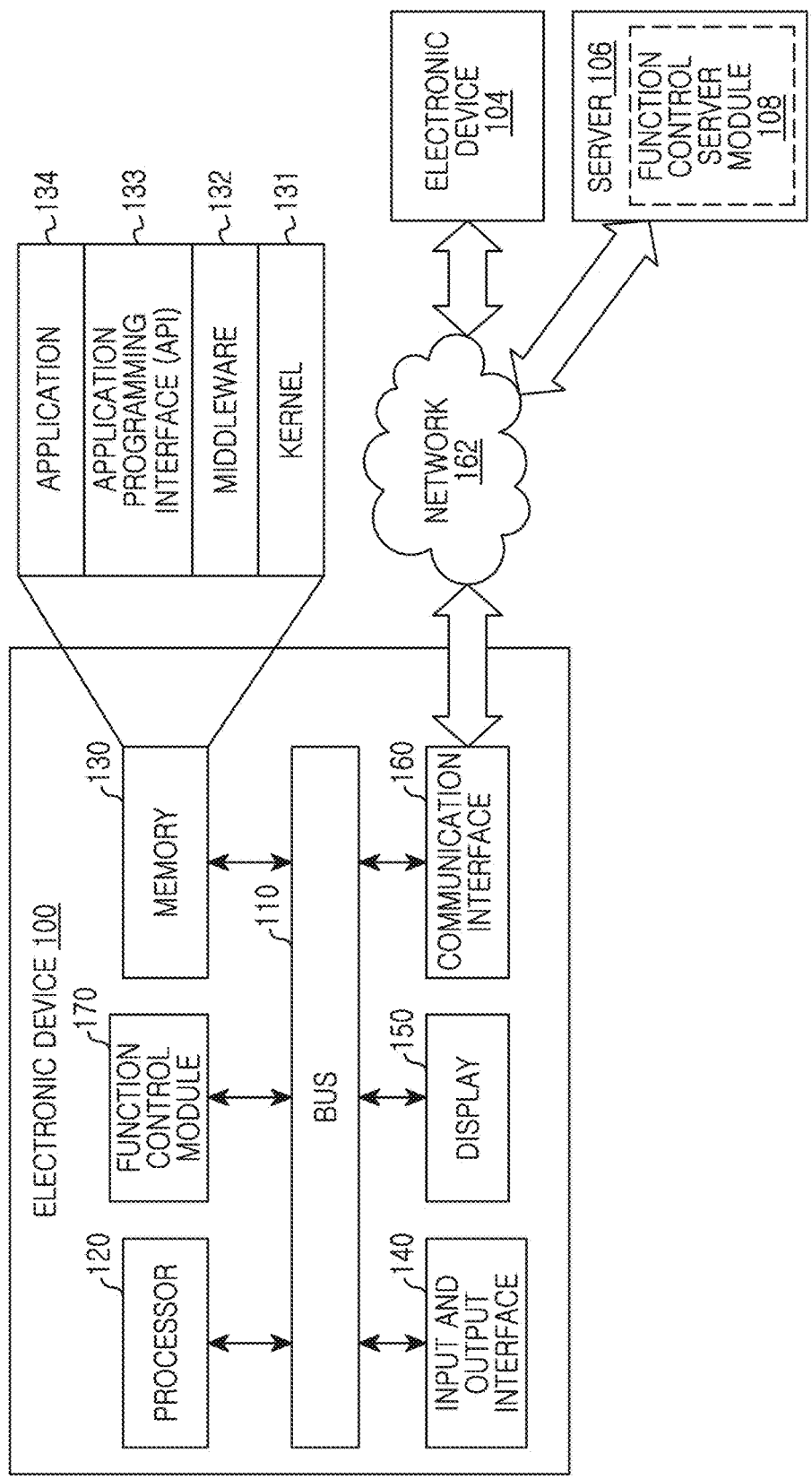
FIG. 1 illustrates a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include" or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, operations, elements, parts, or a combination thereof described in the specifications, and do not preclude the presence or addition of one or more other features, numbers, operations, elements, parts, or a combination thereof.

The term "or" used in the various embodiments of the present disclosure includes any and all combinations of words enumerated with it. For example, "A or B" or "at least one of A or/and B" mean including A, including B, or including both A and B.

Although the terms such as "first" and "second" used in the various embodiments of the present disclosure may modify various elements of the various embodiments, these terms do not limit the corresponding elements. For example, these terms do not limit an order and/or importance of the corresponding elements. These terms may be used for the purpose of distinguishing one element from another element. For example, a first electronic device and a second electronic device all indicate electronic devices and may indicate different electronic devices. For example, a first element may be named a second element without departing from the scope of right of the various embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in the various embodiments of the present disclosure are for the purpose of describing specific embodiments only and are not intended to limit various embodiments of the present disclosure.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments of the present disclosure.

An electronic device according to various embodiments of the present disclosure may be a device that is equipped with a touch detection function. For example, the electronic device may include at least one of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), a Moving Picture Experts Group (MPEG-1 or MPEG-2) Audio Layer III (MP3) player, a mobile medical machine, a camera, or a wearable device (e.g., a head-mounted-device (HMD) such as electronic glasses, electronic clothing, an electronic bracelet, an electronic necklace, an electronic appcessory, electronic tattoos, or a smartwatch).

According to an embodiment of the present disclosure, the electronic device may be a smart home appliance which is equipped with a touch detection function. For example, the smart home appliance may include at least one of a television (TV), a Digital Versatile Disc (DVD) player, a stereo, a refrigerator, an air conditioner, a cleaner, an oven, a microwave oven, a washing machine, an air cleaner, a set-top box, a TV box (e.g., Samsung HomeSync™, Apple TV™, or Goggle TV™), a game console, an electronic dictionary, an electronic key, a camcorder, or an electronic album.

According to an embodiment of the present disclosure, the electronic device may include at least one of various medical machines (e.g., Magnetic Resonance Angiography (MRA), Magnetic Resonance Imaging (MRI), Computed Tomography (CT), a tomograph, an ultrasound machine, and the like), a navigation device, a Global Positioning System (GPS) receiver, an Event Data Recorder (EDR), a Flight Data Recorder (FDR), an automotive infotainment device, electronic equipment for ship (e.g., navigation equipment for a ship, a gyro compass, and the like), avionics, a security device, or an industrial or home robot.

According to an embodiment of the present disclosure, the electronic device may include at least one of a part of furniture or a building/a structure including a touch detection function, an electronic board, an electronic signature receiving device, a projector, and various measurement devices (e.g., devices for measuring water, power, gas, radio waves, and the like).

The electronic device according to various embodiments of the present disclosure may be one or a combination of one or more of the above-mentioned devices. In addition, the electronic device according to various embodiments of the present disclosure may be a flexible device. In addition, it is obvious to an ordinary skilled person in the related art that the electronic device according to various embodiments of the present disclosure is not limited to the above-mentioned devices.

Hereinafter, an electronic device according to various embodiments of the present disclosure will be explained with reference to the accompanying drawings. The term "user" used in the various embodiments of the present disclosure may refer to a person who uses the electronic device or a device that uses the electronic device (e.g., an artificial intelligence electronic device).

FIG. 1 illustrates a block of an electronic device according to an embodiment of the present disclosure.

Referring to FIG. 1, an electronic device 100 may include a bus 110, a processor 120, a memory 130, an input and output interface 140, a display 150, a communication interface 160, and a function control module 170, but is not limited thereto. According to an embodiment of the present disclosure, the function control module 170 may be included in the processor 120 and operated or may be included in a separate module and interwork with the processor 120.

The bus 110 may be a circuit which connects the above-described elements with one another and transmits communication (e.g., a control message) between the above-described elements.

The processor 120 may receive instructions from the other elements (e.g., the memory 130, the input and output interface 140, the display 150, the communication interface 160, or the function control module 170) via the bus 110, decipher the instructions, and perform calculation or data processing according to the deciphered instructions.

The memory 130 may store instructions or data which is received from or generated by the processor 120 or the other elements (e.g., the input and output interface 140, the display 150, the communication interface 160, the function control module 170, and the like).

For example, the memory 130 may include programming modules such as a kernel 131, middleware 132, an Application Programming Interface (API) 133, an application 134, and the like. Each of the above-described programming modules may be configured by software, firmware, hardware, or a combination of two or more of them.

According to an embodiment of the present disclosure, the kernel 131 may control or manage system resources (e.g., the bus 110, the processor 120, the memory 130, and the like) which are used for performing operations or functions implemented in the other programming modules, for example, the middleware 132, the API 133, or the application 134. In addition, the kernel 131 may provide an interface for allowing the middleware 132, the API 133, or the application 134 to access an individual element of the electronic device 100 and control or manage the element.

According to an embodiment of the present disclosure, the middleware 132 may serve as an intermediary to allow the API 133 or the application 134 to communicate with the kernel 131 and exchange data with the kernel 131. In addition, the middleware 132 may perform controlling (e.g., scheduling or load balancing) with respect to work requests received from the application 134, for example, by giving priority to use the system resources of the electronic device 100 (e.g., the bus 110, the processor 120, the memory 130, and the like) to at least one of the applications 134.

According to an embodiment of the present disclosure, the API 133 may be an interface for allowing the application 134 to control a function provided by the kernel 131 or the middleware 132, and, for example, may include at least one interface or function (e.g., instructions) for controlling a file, controlling a window, processing an image, or controlling a text.

According to an embodiment of the present disclosure, the application 134 may include a Short Message Service (SMS)/Multimedia Messaging Service (MMS) application, an email application, a calendar application, a notification application, a health care application (e.g., an application for measuring exercise or a blood sugar), an environment information application (e.g., an application for providing information on atmospheric pressure, humidity, or temperature), and the like. Additionally or alternatively, the application 134 may be an application related to information exchange between the electronic device 100 and an external electronic device (e.g., another electronic device 104). For example, the application related to the information exchange may include a notification relay application for relaying specific information to an external electronic device or a device management application for managing an external electronic device.

For example, the notification relay application may include a function of relaying notification information generated by other applications of the electronic device 100 (e.g., the SMS/MMS application, the email application, the health care application, the environment information application, and the like) to an external electronic device (e.g., the other electronic device 104). Additionally or alternatively, the notification relay application may receive notification information from an external electronic device (e.g., the other electronic device 104) and may relay the same to the user. For example, the device management application may manage (e.g., install, delete or update) a function regarding at least part of an external electronic device (e.g., the other electronic device 104) communicating with the electronic device 100 (e.g., turning on/off the external electronic device (or some parts) or adjusting brightness (or resolution) of a display), an application operating in the external electronic device or a service provided by the external electronic device (e.g., a calling service or a message service).

According to various embodiments of the present disclosure, the application 134 may include an application which is specified according to the attribute (e.g., a kind of an electronic device) of an external electronic device (e.g., the other electronic device 104). For example, when the external electronic device is an MP3 player, the application 134 may include an application related to music replay. Similarly, when the external electronic device is a mobile medical device, the application 134 may include an application related to health care. According to an embodiment of the present disclosure, the application 134 may include at least one of an application specified by the electronic device 100 or an application received from an external electronic device (e.g., a server 106 or the other electronic device 104).

According to an embodiment of the present disclosure, the input and output interface 140 may transmit instructions or data input by a user through an input and output device (e.g., a sensor, a keyboard or a touch screen) to the processor 120, the memory 130, the communication interface 160, or the function control module 170 through the bus 110, for example. For example, the input and output interface 140 may provide data on a user's touch input through a touch screen to the processor 120. In addition, the input and output interface 140 may output instructions or data received from the processor 120, the memory 130, the communication interface 160, or the function control module 170 through the bus 110 through the input and output device (e.g., a speaker or a display). For example, the input and output interface 140 may output voice data processed through the processor 120 to the user through a speaker.

According to an embodiment of the present disclosure, the display 150 may display a variety of information (e.g., multimedia data, text data, and the like) for the user.

According to an embodiment of the present disclosure, the communication interface 160 may connect communication between the electronic device 100 and an external device (e.g., the other electronic device 104 or the server 106). For example, the communication interface 160 may be connected to a network 162 via wireless communication or wire communication to communicate with the external device. The wireless communication may include at least one of WiFi, Bluetooth (BT), Near Field Communication (NFC), a GPS, or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), and the like). The wire communication may include at least one of a Universal Serial Bus (USB), a High Definition Multimedia Interface (HDMI), a Recommended Standard 232 (RS-232), or plain old telephone service (POTS).

According to an embodiment of the present disclosure, the network 162 may be a telecommunications network. The telecommunications network may include at least one of a computer network, Internet, Internet of things, or a telephone network. According to an embodiment of the present disclosure, a protocol for communicating between the electronic device 100 and the external device (e.g., a transport layer protocol, a data link layer protocol or a physical layer protocol) may be supported in at least one of the application 134, the API 133, the middleware 132, the kernel 131, or the communication interface 160.

According to an embodiment of the present disclosure, the function control module 170 may perform a second function according to a palm touch detected while the electronic device 100 performs a first function. According to an embodiment of the present disclosure, the second function may include an alternative function which is pre-set to protect privacy. For example, the second function may include controlling a display screen, controlling a sound output, setting a lock screen, setting a sound output mode, executing a specific application, and the like. According to an embodiment of the present disclosure, the first function may include a function which is performed by execution of an application that requires protection of privacy. For example, the first function may include inputting writing in a writing application, searching a web in a web page, executing music or moving image contents, executing a Text To Speech (TTS) function, inputting data in a personal information input window, and the like.

According to an embodiment of the present disclosure, the function control module 170 may perform the second function according to whether the palm touch detected in the writing application corresponds to a written object or not. For example, when the detected palm touch area overlaps the inputted object, the function control module 170 may set at least part of the object as a security area. In another example, when the detected palm touch area is located within a reference distance from the inputted object, the function control module 170 may blur at least part of the object. In another example, when the detected palm touch area is located within an area designated on the screen, the function control module 170 may process at least part of the object not to be seen from a different angle for security. According to an embodiment of the present disclosure, when a palm touch is detected on currently reproduced contents, the function control module 170 may turn down or mute the volume of the currently reproduced contents. For example, the function control module 170 may change a current sound output mode to a vibrate mode or a silent mode.

According to an embodiment of the present disclosure, the server 106 may support driving of the electronic device 100 by performing at least one of the operations (functions) implemented in the electronic device 100. For example, the server 106 may include a function control server module 108 to support the function control module 170 implemented in the electronic device 100. According to an embodiment of the present disclosure, the function control server module 108 may include at least one element of the function control module 170 and perform at least one of the operations implemented in the function control module 170 (e.g., on behalf of the function control module 170).

According to an embodiment of the present disclosure, the function control module 170 may process at least part of information acquired from the other elements (e.g., the processor 120, the memory 130, the input and output interface 140, the communication interface 160, or the like), and provide the information to the user in various methods. For example, the function control module 170 may control at least some function of the electronic device 100 using the processor 120 or independently from the processor 120, such that the electronic device 100 interworks with another electronic device (e.g., the other electronic device 104 or the server 106). According to an embodiment of the present disclosure, at least one element of the function control module 170 may be included in the server 106 (e.g., the function control server module 108), and may be supported with at least one operation to be implemented in the function control module 170 by the server 106.

Figure 2:
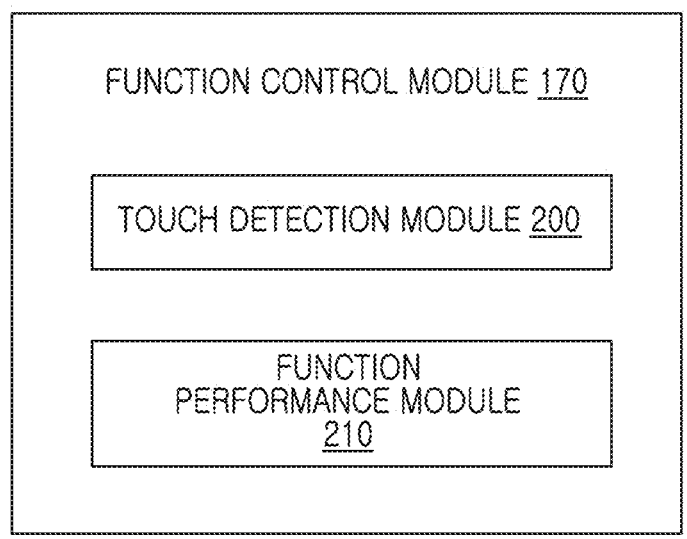
FIG. 2 illustrates a block diagram of a function control module according to an embodiment of the present disclosure.

FIG. 2 illustrates a block diagram of a function control module according to an embodiment of the present disclosure.

Referring to FIG. 2, the function control module 170 may include a touch detection module 200 and a function performance module 210. However, this should not be considered as limiting, and the function control module 170 may further include an additional module.

According to an embodiment of the present disclosure, the touch detection module 200 may detect a palm touch while a first function is being performed. According to an embodiment of the present disclosure, the first function may include a function which is performed by execution of an application that requires protection of privacy. For example, the first function may include inputting writing in a writing application, searching a web in a web application, executing music or moving image contents, executing a TTS function, inputting data in an authentication application or a personal information input window, and the like. According to an embodiment of the present disclosure, the touch detection module 200 may detect at least one of a finger touch, a pen touch, or a palm touch in a state in which a specific application is executed. For example, the touch detection module 200 may distinguish between the respective touch types using a capacitive method or a resistive method. For example, the touch detection module 200 may recognize a palm touch when a touch greater than or equal to a reference area is detected. In another example, the electronic device 100 may recognize a palm touch when the touch greater than or equal to the reference area is detected for a time greater than or equal to a predetermined reference time. According to an embodiment of the present disclosure, when the user holds an input pen close to a sensing area without touching a touch screen with the input pen, the electronic device 100 may disable the function of a touch panel for sensing a human body and exclude an input error which may be caused by a user's palm touch. Therefore, when the user uses the input pen, the electronic device 100 may prevent a data input error caused by a human body touch even if the user places the user's palm on the touch screen.

According to an embodiment of the present disclosure, the touch detection module 200 may determine whether a palm touch detected in a state in which a specific application is executed corresponds to a detected pen touch (or finger touch). For example, the touch detection module 200 may determine whether the detected palm touch area is located within a reference distance from the detected pen touch area. In another example, the touch detection module 200 may determine whether the detected palm touch area is located within an area designated on the screen. According to an embodiment of the present disclosure, the touch detection module 200 may determine whether a palm touch detected in a state in which an application capable of inputting writing is executed corresponds to a written object. For example, the touch detection module 200 may determine whether the detected palm touch area overlaps the inputted object. In another example, the touch detection module 200 may determine whether the detected palm touch area is located within a reference distance from the inputted object. According to an embodiment of the present disclosure, the touch detection module 200 may determine whether a palm touch detected in a state in which contents are displayed or executed corresponds to the corresponding contents. For example, the touch detection module 200 may determine whether the detected palm touch area overlaps the corresponding contents. In another example, the touch detection module 200 may determine whether the detected palm touch area is located within a reference distance from the corresponding contents.

According to an embodiment of the present disclosure, the function performance module 210 may perform a second function according to the detected palm touch. According to an embodiment of the present disclosure, the second function may include an alternative function which is pre-set to protect privacy. For example, the second function may include controlling a display screen, controlling a sound output, setting a lock screen, setting a sound output mode, executing a specific application, and the like. According to an embodiment of the present disclosure, the function performance module 210 may set at least part of the contents which are displayed or executed as a security area. In addition, the function performance module 210 may turn down or off the sound volume of the currently executed contents. According to an embodiment of the present disclosure, the function performance module 210 may change a current sound output mode to a vibrate mode or a silent mode. According to various embodiments of the present disclosure, the second function performed according to the detected palm touch may be set variously.

According to various embodiments of the present disclosure, the electronic device may include a touch screen to detect a palm touch, and a processor to perform a second function according to the detected palm touch while performing a first function.

According to various embodiments of the present disclosure, the first function may include a function which is performed by execution of an application that requires protection of privacy.

According to various embodiments of the present disclosure, the first function may include at least one of a writing input application, a web application, an authentication application, a TTS application, and a multimedia reproduction application.

According to various embodiments of the present disclosure, the second function may include an alternative function which is pre-set to protect privacy.

According to various embodiments of the present disclosure, the second function may include at least one of controlling a display screen, controlling a volume, setting a lock screen, setting a security area, setting an output mode, and executing a specific application.

According to various embodiments of the present disclosure, the palm touch may be detected based on a touch area and a touch time of a touch on the touch screen while the first function is being performed.

According to various embodiments of the present disclosure, the processor may perform the second function according to whether the palm touch overlaps a content displayed on the touch screen.

According to various embodiments of the present disclosure, the processor may perform the second function according to whether the palm touch overlaps an object input to the touch screen.

According to various embodiments of the present disclosure, the processor may detect the palm touch in a state in which a touch input is detected, calculate a distance between the detected palm touch area and the touch input area, and perform the second function according to a result of the calculating.

According to various embodiments of the present disclosure, the touch input may be a touch input which is performed by a finger or an input pen to input writing.

Figure 3:
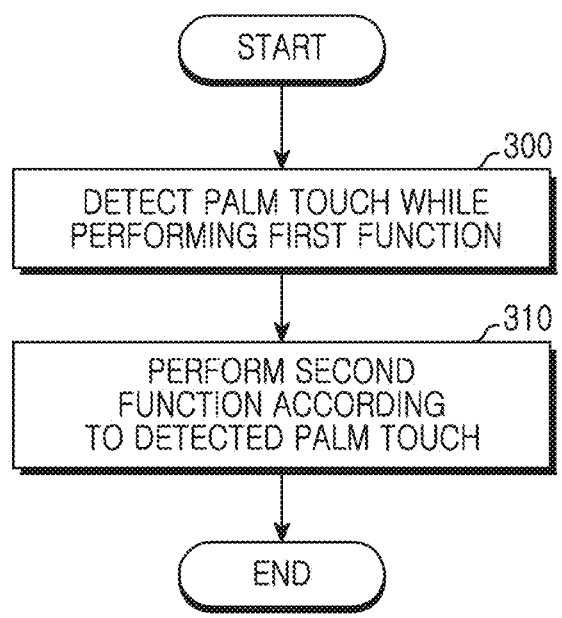
FIG. 3 illustrates a flowchart of a procedure for performing a corresponding function based on a palm touch according to an embodiment of the present disclosure.

FIG. 3 illustrates a flowchart of a procedure for performing a corresponding function based on a palm touch according to an embodiment of the present disclosure.

Referring to FIG. 3, in operation 300, the electronic device 100 may detect a palm touch while performing a first function. According to an embodiment of the present disclosure, the first function may include a function which is performed by execution of an application that requires protection of privacy. For example, the first function may include inputting writing in a writing application, searching a web in a web page, executing music or moving image contents, executing a TTS function, inputting data in a personal information input window, and the like. According to an embodiment of the present disclosure, the electronic device 100 may detect a palm touch by the palm of the user's right hand or left hand while performing the first function. For example, the user may hide a part of the screen using the user's hand as a gesture for protecting user's privacy. For example, the electronic device 100 may recognize a palm touch when a touch greater than or equal to a reference area is detected. In another example, the electronic device 100 may recognize a palm touch when the touch greater than or equal to the reference area is detected for a time greater than or equal to a reference time. However, this should not be considered as limiting, and the palm touch may be defined according to various criteria.

In operation 310, the electronic device 100 may perform a second function according to the detected palm touch. According an embodiment of the present disclosure, the second function may include an alternative function which is pre-set to protect privacy. For example, the second function may include controlling a display screen, controlling a sound output, setting a lock screen, setting a sound output mode, executing a specific application, and the like.

According to an embodiment of the present disclosure, the electronic device 100 may perform the second function according to whether the palm touch detected in a writing application corresponds to a written object. For example, when the detected palm touch area overlaps the inputted object, the electronic device 100 may set at least part of the object as a security area. In another example, when the detected palm touch area is located within a reference distance from the inputted object, the electronic device 100 may blur at least part of the object. In another example, when the detected palm touch area is located within an area designated on the screen, the electronic device 100 may process at least part of the object not to be seen from a different angle for security. According to an embodiment of the present disclosure, when a palm touch is detected on currently reproduced contents, the electronic device 100 may turn down or mute the volume of the currently reproduced contents. For example, the electronic device 100 may change a current sound output mode to a vibrate mode or a silent mode.

Figure 4:
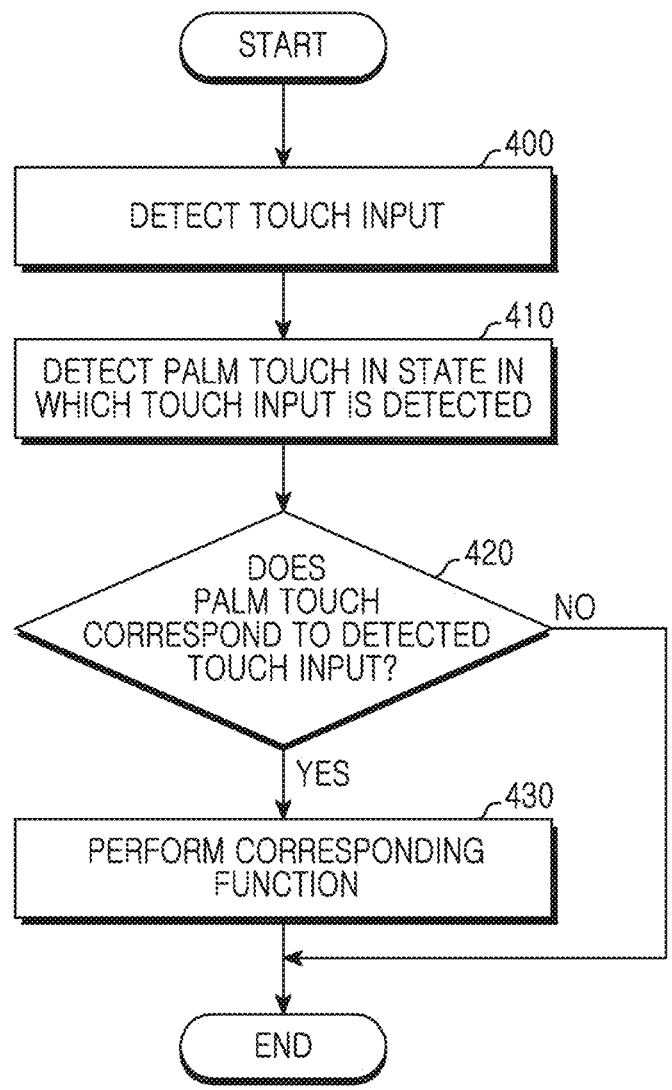
FIG. 4 illustrates a flowchart of a procedure for performing a corresponding function based on a palm touch according to an embodiment of the present disclosure.

FIG. 4 illustrates a flowchart of a procedure for performing a corresponding function based on a palm touch according to an embodiment of the present disclosure.

Figure 5:
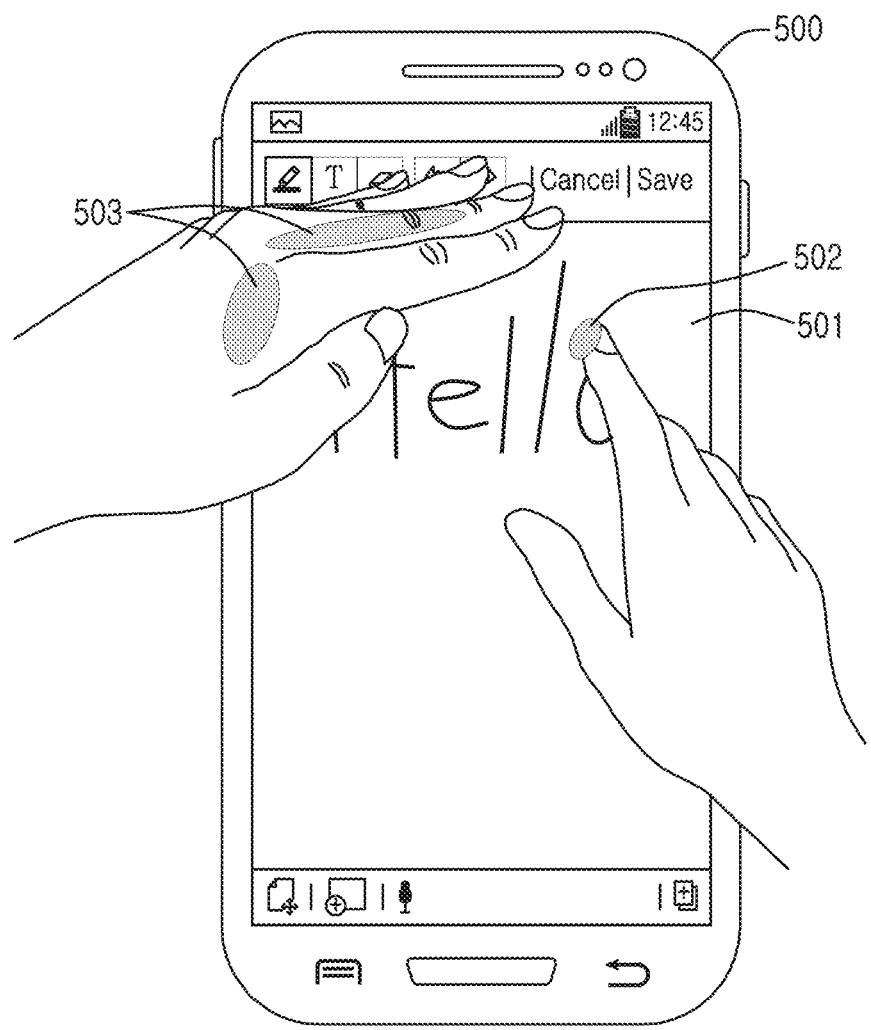
FIG. 5 illustrates a view of a method for performing a corresponding function based on a palm touch according to an embodiment of the present disclosure.
Figure 6:
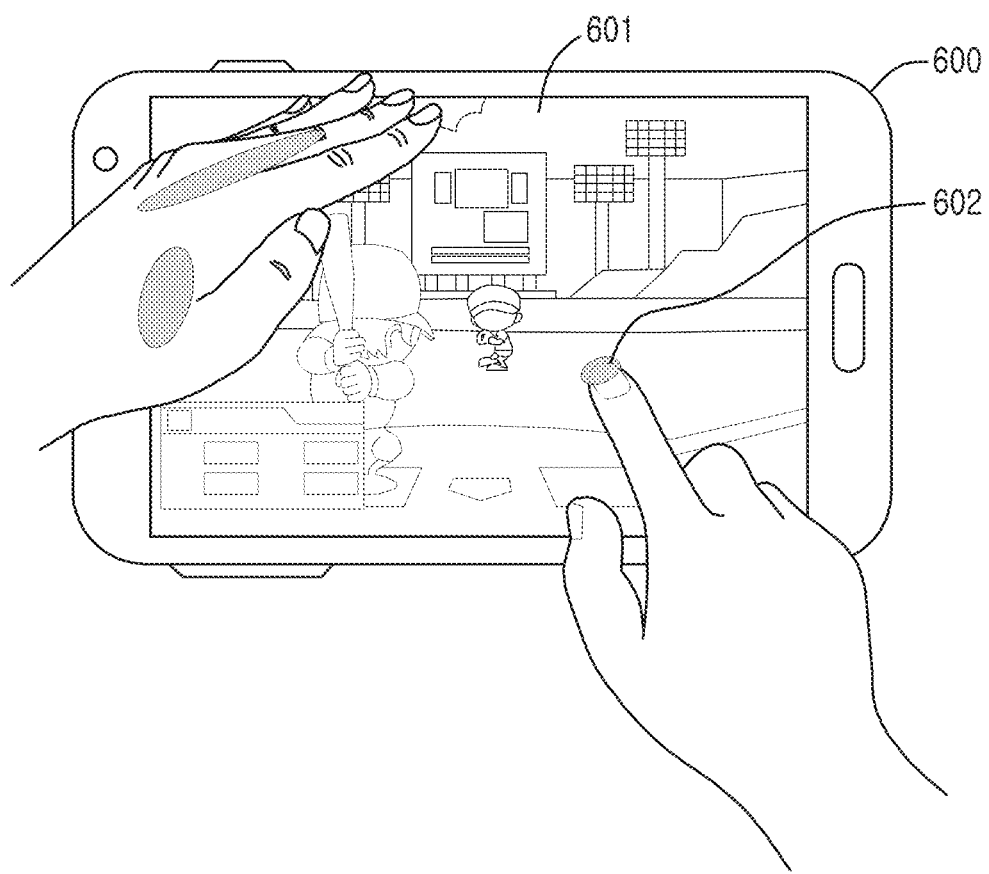
FIG. 6 illustrates a view of a method for performing a corresponding function based on a palm touch according to an embodiment of the present disclosure.

FIGS. 5 and 6 illustrate views of a method for performing a corresponding function based on a palm touch according to various embodiments of the present disclosure.

Referring to FIG. 4, in operation 400, the electronic device may detect a touch input. For example, the electronic device may detect a touch input by an inputting means such as a finger or an input pen (stylus or the like) through a touch screen.

Referring to FIG. 5, an electronic device 500 may detect a touch input (area) 502 by a finger or an input pen in a state in which a memo application 501 is executed. The electronic device 500 may display various objects such as points, lines, characters, figures, and the like on the screen according to the touch input 502 detected on the memo application 501.

Referring to FIG. 6, an electronic device 600 may detect a touch input 602 by a finger or an input pen in a state in which a game application 601 is executed. The electronic device 600 may perform a function which matches the touch input 602 detected on the game application 601.

In operation 410, the electronic device may detect a palm touch in the state in which the touch input is detected. For example, the user may place the user's palm on the screen of the electronic device as a gesture for protecting user's privacy. According to an embodiment of the present disclosure, as shown in FIG. 5, the user may hide a part of the screen using the user's palm as a gesture for hiding the currently executed or displayed application 501. In this case, the electronic device 500 may detect a palm touch (area) 503 made by the user's palm. For example, the electronic device 500 may recognize the palm touch 503 when a touch greater than or equal to a reference area is detected. In another example, the electronic device 500 may recognize the palm touch 503 when the touch greater than or equal to the reference area is detected for a time greater than or equal to a reference time. However, this should not be considered as limiting, and the palm touch may be defined according to various criteria.

In operation 420, the electronic device may determine whether the palm touch corresponds to the detected touch input or not. According to an embodiment of the present disclosure, as shown in FIG. 5, the electronic device 500 may determine whether the detected palm touch area 503 is located within a reference distance from the detected touch input area 502. According to an embodiment of the present disclosure, the electronic device 500 may determine whether the detected palm touch area 503 is located within an area designated on the screen.

When the palm touch corresponds to the detected touch input, the electronic device may perform a corresponding function in operation 430. According to an embodiment of the present disclosure, the electronic device may control the volume of the currently executed or displayed application or contents. For example, the electronic device may turn down or mute the volume of the currently executed or displayed application or contents. In another example, the electronic device may change a current sound output mode to a vibrate mode or silent mode. According to an embodiment of the present disclosure, the electronic device may set at least part of the area of the currently executed or displayed application or contents as a security area. For example, the electronic device may blur at least part of the area of the currently executed or displayed application or contents. In another example, the electronic device may process at least part of the area of the currently executed or displayed application or contents not to be seen from a different angle for security. According to an embodiment of the present disclosure, the electronic device may execute a pre-defined application. For example, the electronic device may execute a specific application according to the detected palm touch. However, this should not be considered as limiting, and the electronic device may further perform various functions according to user settings. According to various embodiments of the present disclosure, the electronic device may apply the present embodiment of the present disclosure in various situations, such as a situation in which a message creation screen, a webpage execution screen, or a Social Networking Service (SNS) application execution screen is displayed, and a situation in which moving image or music contents are executed, in addition to the state in which the above-described application is executed.

Figure 7:
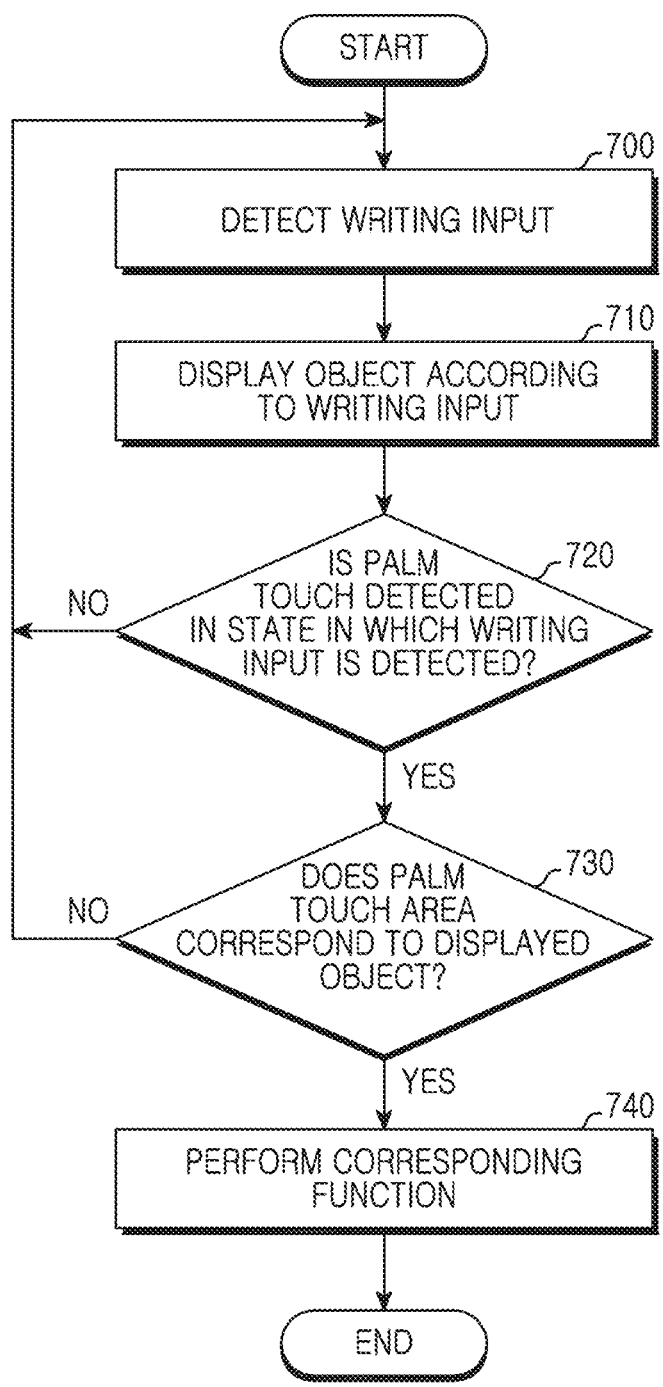
FIG. 7 illustrates a flowchart of a procedure for performing a corresponding function based on a palm touch according to an embodiment of the present disclosure.

FIG. 7 illustrates a flowchart of a procedure for performing a corresponding function based on a palm touch according to an embodiment of the present disclosure.

Figure 8:
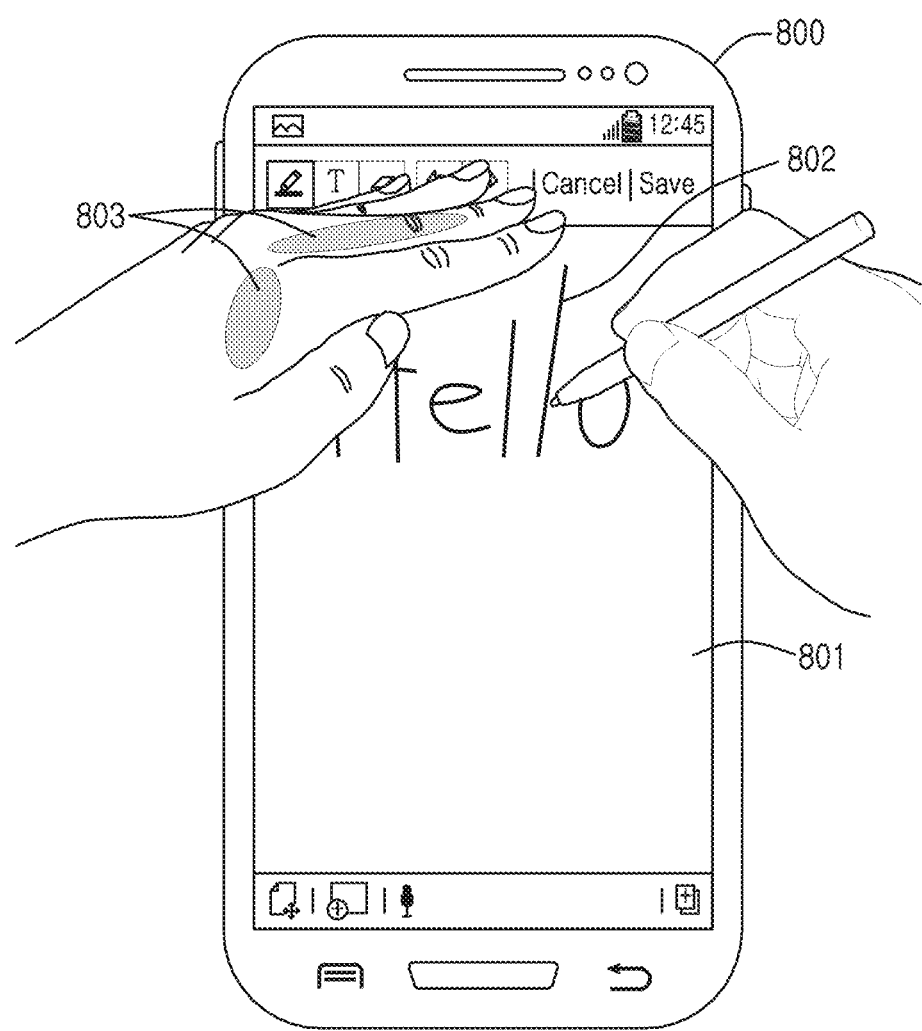
FIG. 8 illustrates a view of a method for performing a corresponding function based on a palm touch according to an embodiment of the present disclosure.
Figure 9:
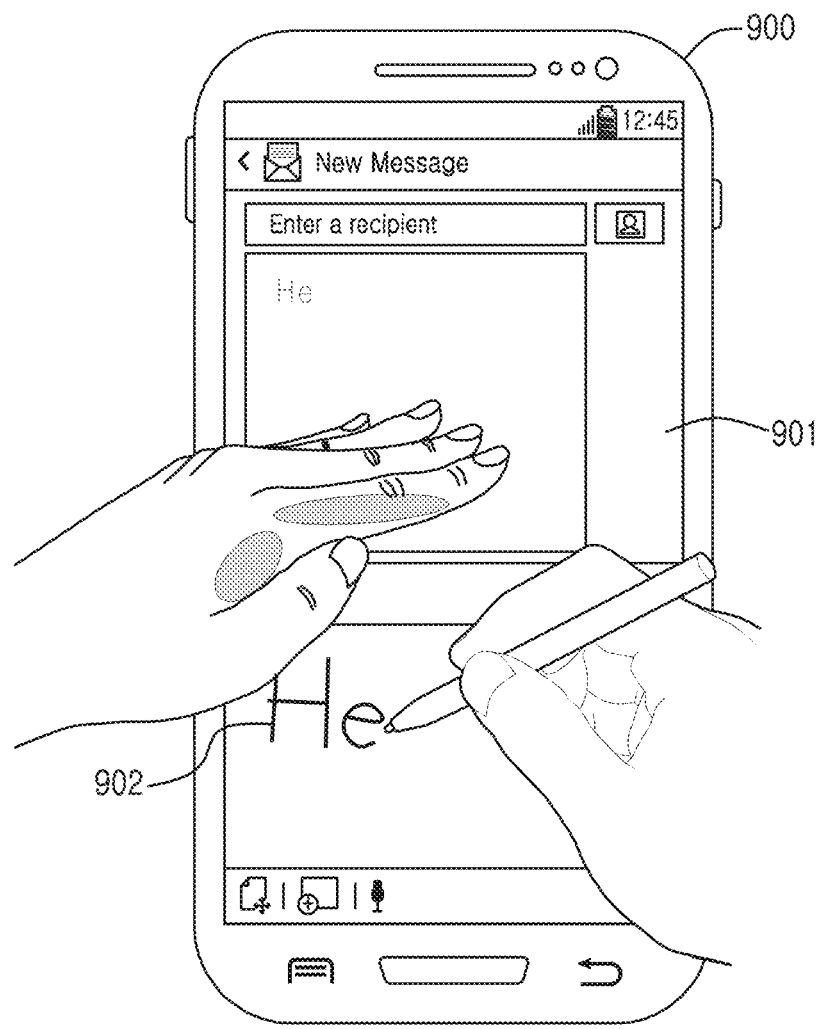
FIG. 9 illustrates a view of a method for performing a corresponding function based on a palm touch according to an embodiment of the present disclosure.

FIGS. 8 and 9 illustrate views of a method for performing a corresponding function based on a palm touch according to various embodiments of the present disclosure Referring to FIG. 7, in operation 700, an electronic device may detect a writing input. For example, the electronic device may detect a touch input by an inputting means such as a finger or an input pen (stylus or the like) through a touch screen in a state in which an application capable of inputting writing (e.g., a memo application, a message creation application, and the like) is executed.

Referring to FIG. 8, an electronic device 800 may detect a writing input by a finger or an input pen in a state in which a memo application 801 is executed.

Referring to FIG. 9, an electronic device 900 may detect a writing input by a finger or an input pen in a state in which a message creation application 901 is executed.

In operation 710, the electronic device may display an object according to the detected writing input. For example, as shown in FIG. 8, the electronic device 800 may display various objects 802 such as points, lines, characters, figures, and the like according to the writing input detected on the memo application 801. In another example, as shown in FIG. 9, the electronic device 900 may display an object 902 on the screen according to the writing input detected on the message creation application 901.

In operation 720, the electronic device may determine whether a palm touch is detected or not in the state in which the writing input is detected. For example, the user may place user's palm on the screen of the electronic device as a gesture for protecting user's privacy. According to an embodiment of the present disclosure, as shown in FIG. 8, the user may hide a part of the screen using the user's palm as a gesture for hiding the currently executed or displayed application 801. In this case, the electronic device 800 may detect a palm touch (area) 803 by the user's palm. For example, the electronic device 800 may recognize the palm touch 803 when a touch greater than or equal to a reference area is detected. In another example, the electronic device 800 may recognize the palm touch 803 when the touch greater than or equal to the reference area is detected for a time greater than or equal to a reference time. However, this should not be considered as limiting, and the palm touch may be defined according to various criteria.

When the palm touch is detected in the state in which the writing input is detected, the electronic device may determine whether the palm touch area corresponds to the displayed object or not in operation 730. According to an embodiment of the present disclosure, as shown in FIG. 8, the electronic device 800 may determine whether the detected palm touch area 803 overlaps the displayed objects 802 or not. According to an embodiment of the present disclosure, the electronic device 800 may determine whether the detected palm touch area 803 is located within a reference distance from the displayed objects 802. According to an embodiment of the present disclosure, the electronic device 800 may determine whether the detected palm touch area 803 is located within an area designated on the screen.

When the palm touch area corresponds to the displayed object, the electronic device may perform a corresponding function in operation 740. According to an embodiment of the present disclosure, the electronic device may control the volume outputted when the user inputs writing in the writing input application. For example, the electronic device may turn down or mute the volume outputted from the writing input application. In another example, the electronic device may change a current sound output mode to a vibrate mode or a silent mode. According to an embodiment of the present disclosure, the electronic device may set at least part of the area of the writing input application as a security area. For example, the electronic device may blur at least part of the area of the writing input application. In another example, the electronic device may process at least part of the area of the writing input application not to be seen from a different angle for security. In another example, the electronic device may lock or store at least part of the area of the writing input application such that the at least part of the area of the writing input application cannot be modified. However, this should not be considered as limiting, and the electronic device may further perform various functions according to user settings. According to various embodiments of the present disclosure, the electronic device may apply the present embodiment of the present disclosure to various applications capable of inputting writing, in addition to the memo application and the message creation application.

Figure 10:
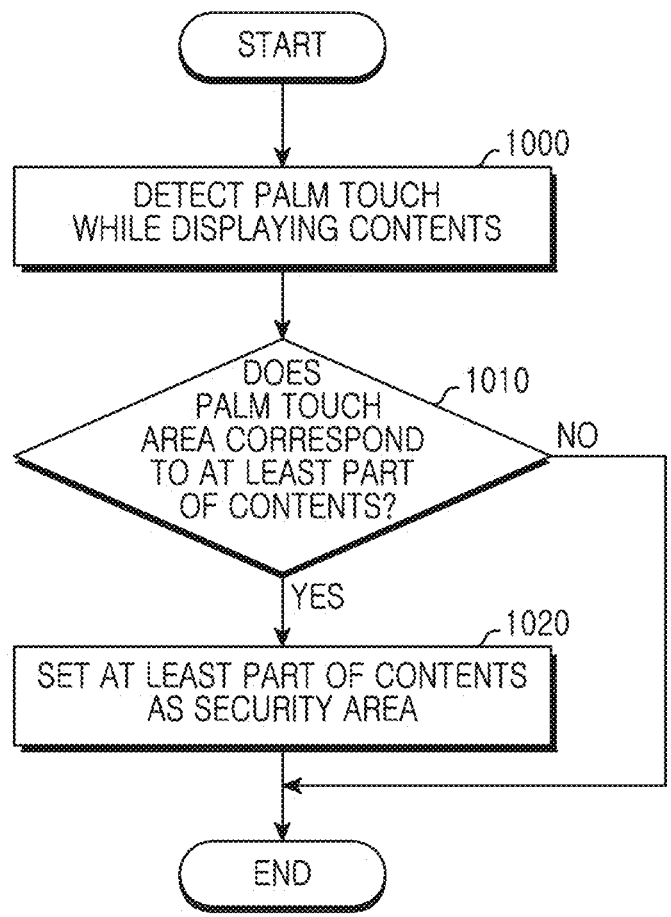
FIG. 10 illustrates a flowchart of a procedure for securing contents based on a palm touch according to an embodiment of the present disclosure.

FIG. 10 illustrates a flowchart of a procedure for securing contents based on a palm touch according to an embodiment of the present disclosure.

Figure 11:
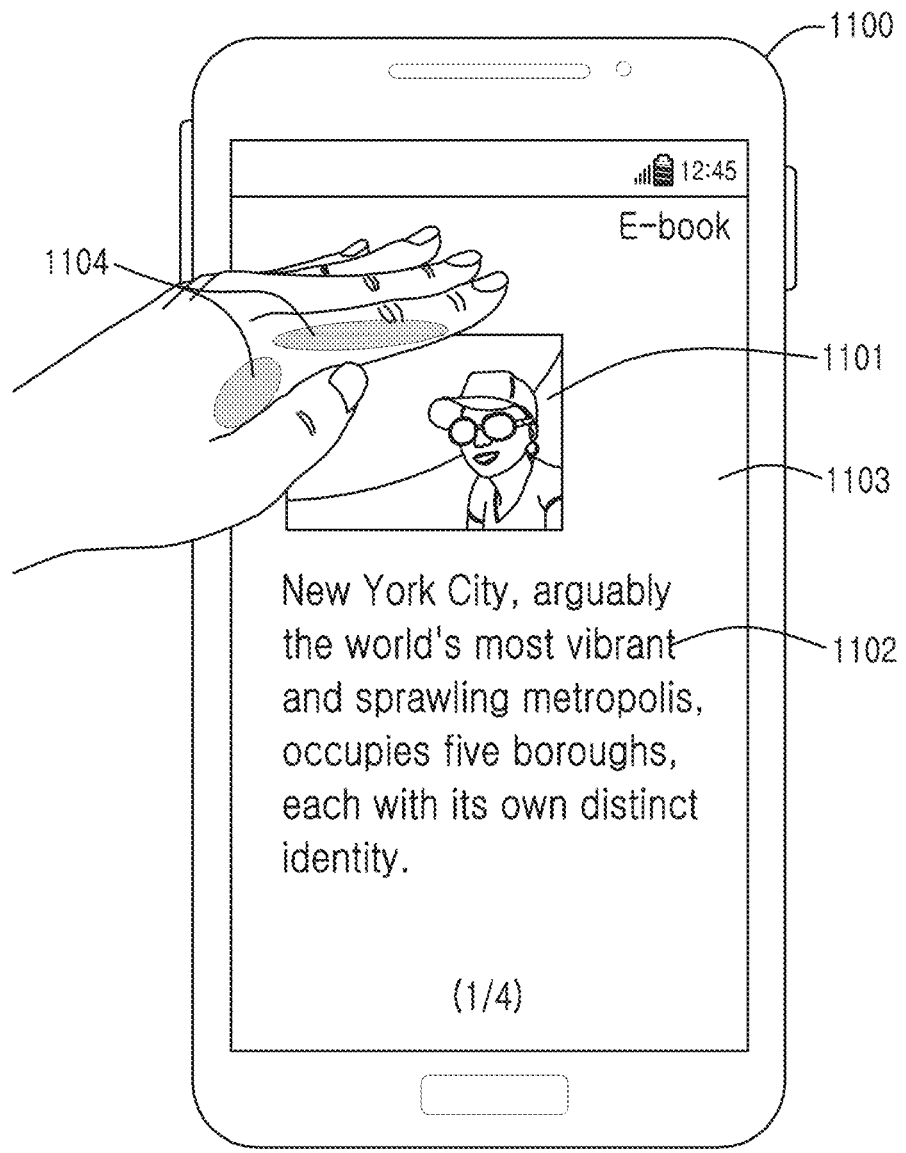
FIG. 11 illustrates a view of a method for securing contents based on a palm touch according to an embodiment of the present disclosure.
Figure 12:
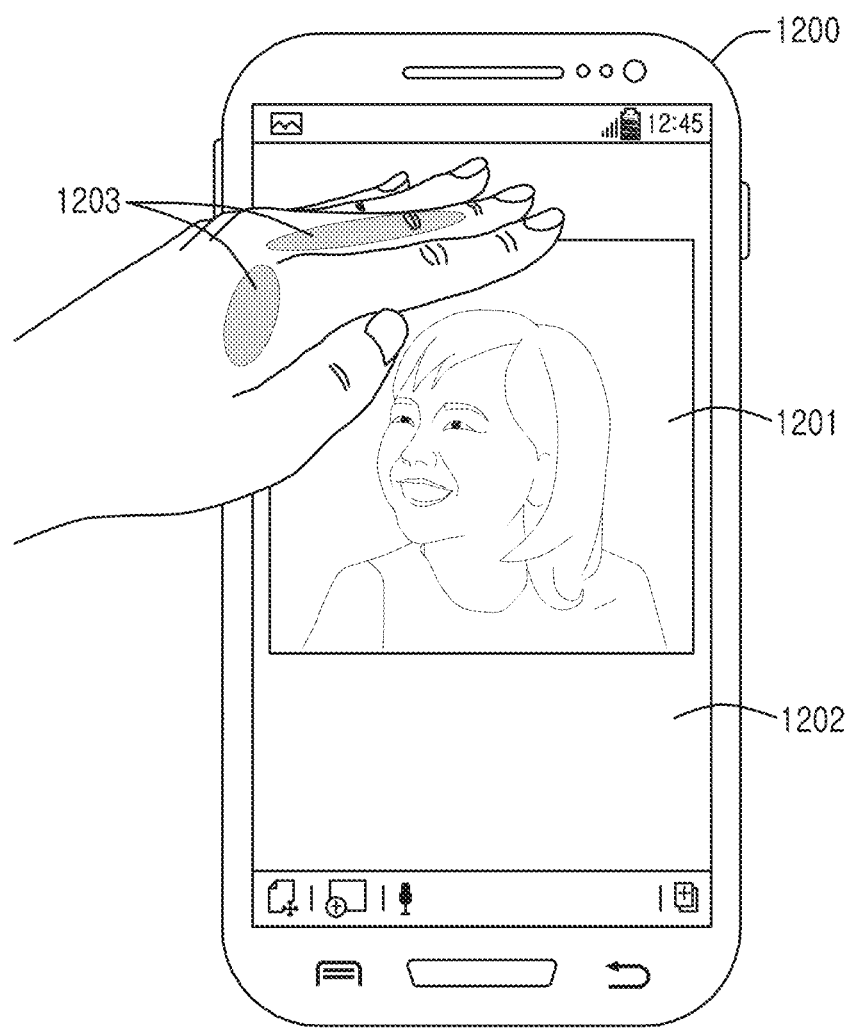
FIG. 12 illustrates a view of a method for securing contents based on a palm touch according to an embodiment of the present disclosure.

FIGS. 11 and 12 illustrate views of a method for securing contents based on a palm touch according to various embodiments of the present disclosure Referring to FIG. 10, in operation 1000, an electronic device may detect a palm touch while displaying contents. For example, the electronic device may detect a palm touch by a palm in a state in which various contents such as a text, a photo, a moving image, and the like are displayed. The user may hide the corresponding contents by placing user's palm on the corresponding contents as a gesture for protecting user's privacy.

Referring to FIG. 11, an electronic device 1100 may detect a palm touch (area) 1104 by a palm in a state in which a webpage 1103 including a photo 1101 and a text 1102 is displayed. For example, the electronic device 1100 may recognize the palm touch 1104 when a touch greater than or equal to a reference area is detected. In another example, the electronic device 110 may recognize the palm touch 1104 when the touch greater than or equal to the reference area is detected for a time greater than or equal to a reference time.

Referring to FIG. 12, an electronic device 1200 may detect a palm touch 1203 by a palm in a state in which a gallery application 1202 including a stored photo 1202 is executed. However, this should not be considered as limiting, and the palm touch may be defined according to various criteria.

In operation 1010, the electronic device may determine whether the detected palm touch area corresponds to at least part of the contents. According to an embodiment of the present disclosure, as shown in FIG. 11, the electronic device 1100 may determine whether the detected palm touch area 1104 overlaps the displayed photo 1101 or not. According to an embodiment of the present disclosure, the electronic device 1100 may determine whether the detected palm touch area 1104 is located within a reference distance from the displayed photo 1101. According to an embodiment of the present disclosure, the electronic device 1100 may determine whether the detected palm touch area 1104 is located within an area designated on the screen.

When the palm touch area corresponds to at least part of the contents, the electronic device may set at least part of the contents as a security area in operation 1020. According to an embodiment of the present disclosure, when the palm touch area 1104 corresponds to the photo 1101 of the webpage 1103 as shown in FIG. 11, the electronic device 110 may process the corresponding photo 1101 as a security area. For example, the electronic device 1100 may blur the corresponding photo 1101. In another example, the electronic device 1100 may process the corresponding photo 1101 not to be seen from a different angle for security. However, this should not be considered as limiting, and the electronic device may secure the contents in various methods according to user settings. According to various embodiments of the present disclosure, the electronic device may set security on a screen including various contents which need protection of privacy, in addition to the above-described contents.

Figure 13:
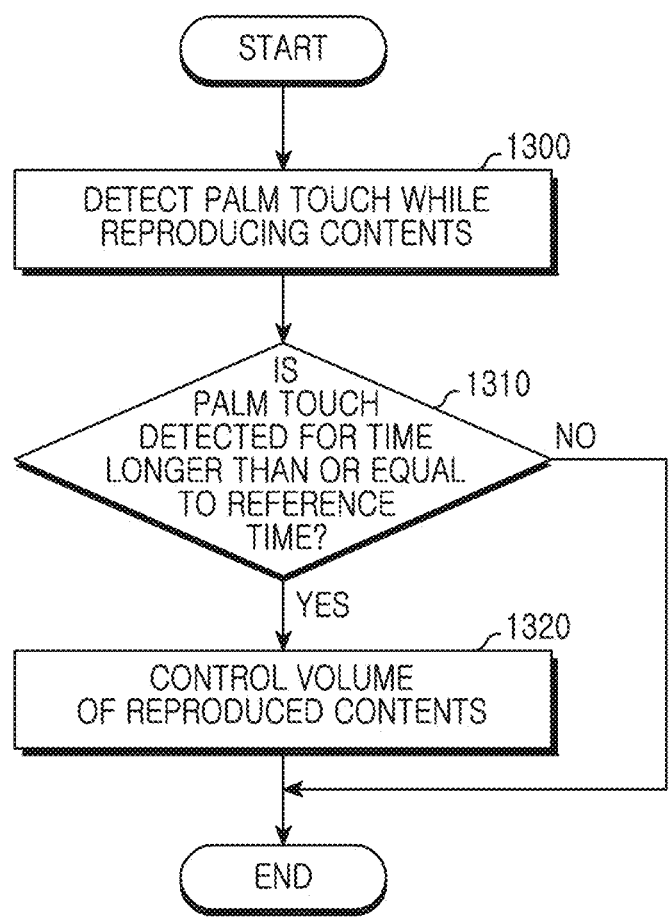
FIG. 13 illustrates a flowchart of a procedure for controlling the volume of reproduced contents based on a palm touch according to an embodiment of the present disclosure.

FIG. 13 illustrates a flowchart of a procedure for controlling the volume of reproduced contents based on a palm touch according to an embodiment of the present disclosure.

Figure 14:
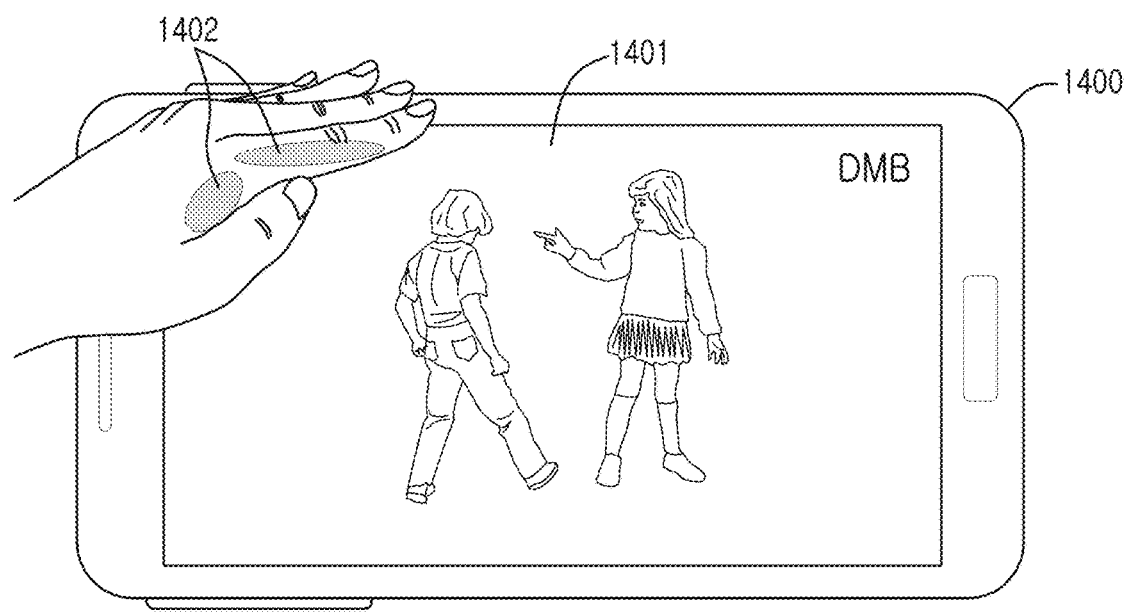
FIG. 14 illustrates a view of a method for controlling the volume of reproduced contents based on a palm touch according to an embodiment of the present disclosure.
Figure 15:
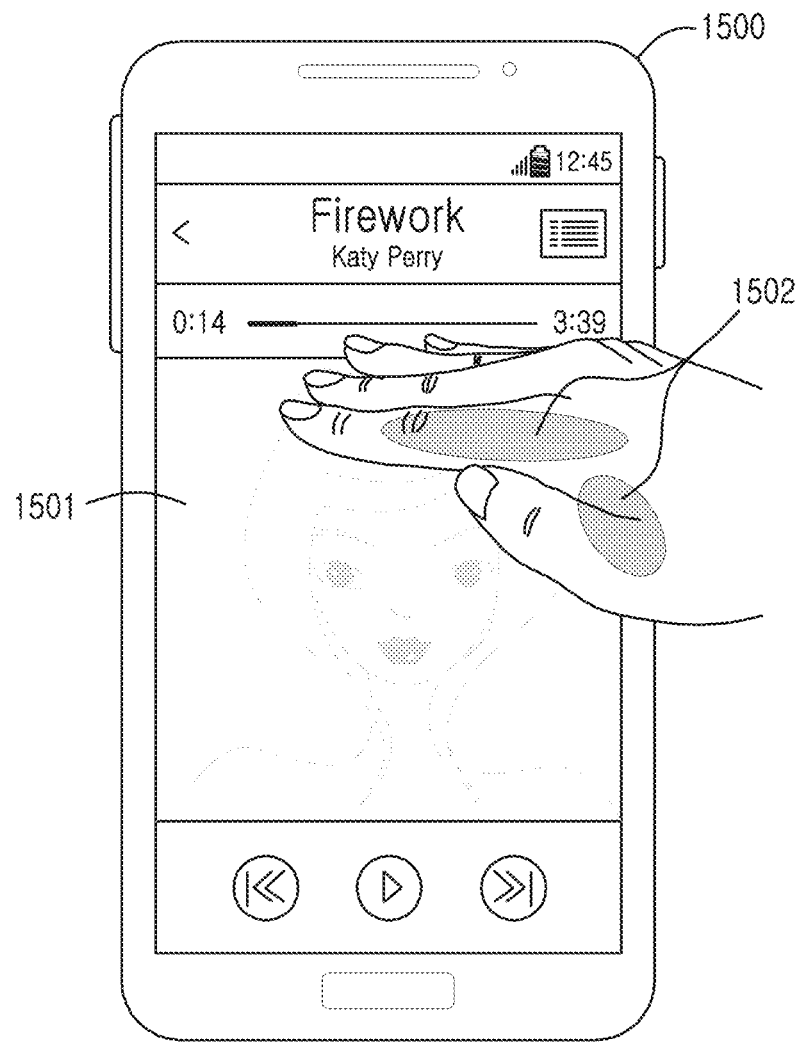
FIG. 15 illustrates a view of a method for controlling the volume of reproduced contents based on a palm touch according to an embodiment of the present disclosure.

FIGS. 14 and 15 illustrate views of a procedure for controlling volume of reproduced contents based on a palm touch according to various embodiments of the present disclosure.

Referring to FIG. 13, in operation 1300, an electronic device may detect a palm touch while reproducing contents. For example, the electronic device may detect a palm touch by a palm in a state in which various contents such as music, a music video, a moving image, and the like are reproduced.

Referring to FIG. 14, an electronic device 1400 may detect a palm touch 1402 by a palm in a state in which Digital Multimedia Broadcasting (DMB) 1401 is executed. For example, the electronic device 1400 may recognize the palm touch 1402 when a touch greater than or equal to a reference area is detected.

Referring to FIG. 15, an electronic device 1500 may detect a palm touch 1502 by a palm in a state in which a music application 1501 is executed.

In operation 1310, the electronic device may determine whether the palm touch is detected for a time greater than or equal to a reference time. According to an embodiment of the present disclosure, the electronic device may detect the palm touch during a specific time to determine whether the detected palm touch is an unintended touch or an intended touch.

When the palm touch is detected for a time greater than or equal to the reference time, the electronic device may control the volume of the reproduced contents. According to an embodiment of the present disclosure, when the palm touch 1402 is detected for a time greater than or equal to the reference time as shown in FIG. 14, the electronic device 1400 may control the volume of the reproduced DMB 1402. For example, the electronic device 1400 may turn down or mute the volume outputted from the DMB 1402. In another example, the electronic device 1400 may change a current sound output mode to a vibrate mode or a silent mode. According to an embodiment of the present disclosure, the electronic device may control the volume of various contents generating a sound output, in addition to the above-described contents.

Figure 16:
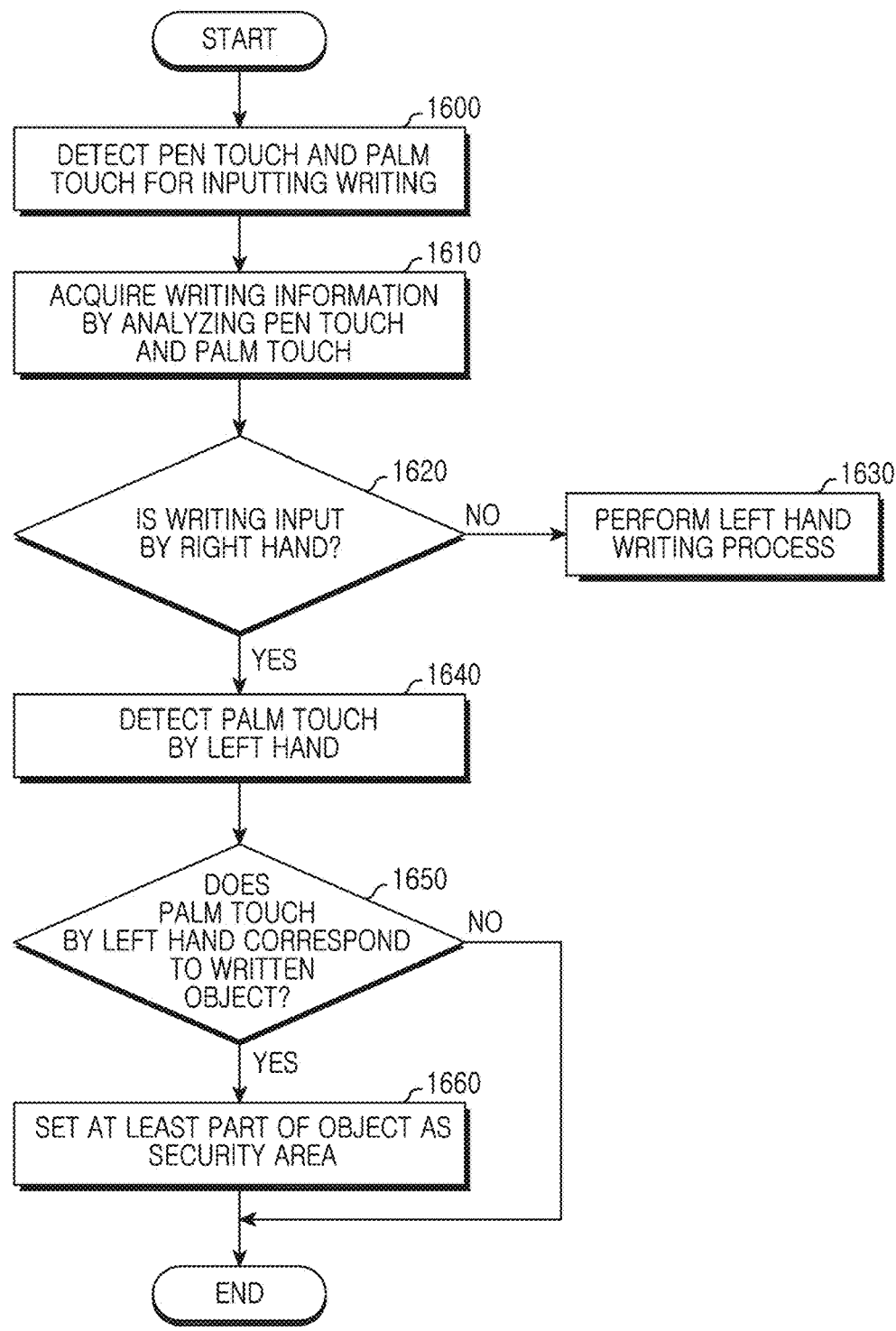
FIG. 16 illustrates a flowchart of a procedure for setting a security area based on a palm touch according to an embodiment of the present disclosure.

FIG. 16 illustrates a flowchart of a procedure for setting a security area based on a palm touch according to an embodiment of the present disclosure.

Figure 17:
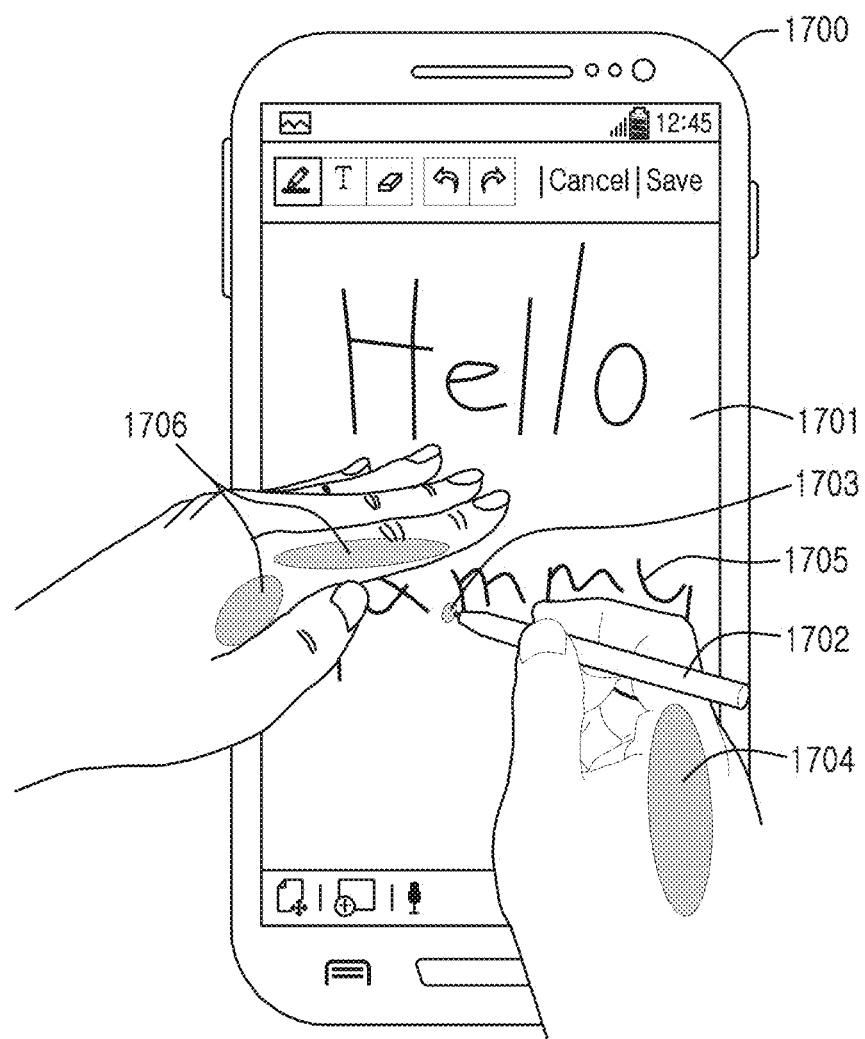
FIG. 17 illustrates a view of a method for setting a security area based on a palm touch according to an embodiment of the present disclosure.

FIG. 17 illustrates a view showing a method for setting a security area based on a palm touch according to an embodiment of the present disclosure.

Referring to FIG. 16, the electronic device may detect a pen touch and a palm touch for inputting writing in operation 1600. For example, referring to FIG. 17, an electronic device 1700 may detect a pen touch 1703 by an input pen 1702 (stylus or the like) and a palm touch 1704 by a palm through a touch screen in a state in which an application 1701 capable of inputting writing (e.g., a memo application, a message creation application, and the like) is executed. According to an embodiment of the present disclosure, when the user holds the input pen 1702 close to a sensing area without touching the touch screen with the input pen 1702, the electronic device may disable the function of a touch panel for sensing a human body and exclude an input error which may be caused by the palm touch 1704 of the user. Accordingly, when the user uses the input pen 1702, the electronic device may prevent a data input error which may be caused by a touch by a human body even if the user places user's palm on the touch screen. The electronic device 1700 may display various objects 1705 such as points, lines, characters, figures, and the like on the screen according to the detected pen touch 1703.

In operation 1610, the electronic device may acquire writing information by analyzing the pen touch and the palm touch. According to an embodiment of the present disclosure, when the user inputs writing using the input pen, the electronic device may detect the kind of the pen, the movement of the pen, the pressure of the pen, and the rotation angle of the pen regarding the pen touch. In addition, the electronic device may detect the touch area and the touch shape of the palm touch detected when the user inputs writing using the input pen. For example, the electronic device may detect a writing direction by analyzing the acquired pen touch information and palm touch information, and may determine whether the user writes with the user's right hand or left hand.

In operation 1620, the electronic device may determine whether the writing is input by the right hand. According to an embodiment of the present disclosure, the electronic device may determine whether the writing is input by the right hand or left hand based on the acquired writing information.

When the writing input is not by the right hand, the electronic device may perform a left hand writing process in operation 1630. For example, a right hand writing process and a left hand writing process may be set respectively.

When the writing input is by the right hand, the electronic device may detect a palm touch by the left hand in operation 1640. For example, the user may place the user's left hand on the screen of the electronic device as a gesture for protecting user's privacy. According to an embodiment of the present disclosure, as shown in FIG. 17, the user may hide a part of the screen using the user's palm as a gesture for hiding the objects 1705 displayed on the currently executed application 1701. In this case, the electronic device 1700 may detect a palm touch (area) 1706 by the palm of the left hand. For example, the electronic device 1700 may recognize the palm touch 1706 when a touch greater than or equal to a reference area is detected. In another example, the electronic device 1700 may recognize the palm touch 1706 when the touch greater than or equal to the reference area is detected for a time greater than or equal to a reference time. However, this should not be considered as limiting, and the palm touch may be defined according to various criteria.

In operation 1650, the electronic device may determine whether the palm touch by the left hand corresponds to a written object. According to an embodiment of the present disclosure, as shown in FIG. 17, the electronic device 1700 may determine whether the palm touch area 1706 by the left hand overlaps the displayed objects 1705. According to an embodiment of the present disclosure, the electronic device 1705 may determine whether the palm touch area 1706 by the left hand is located within a reference distance from the displayed objects 1705. According to an embodiment of the present disclosure, the electronic device 1700 may determine whether the palm touch area 1706 by the left hand is located within an area designated on the screen.

When the palm touch by the left hand corresponds to the written object, the electronic device may set at least part of the object as a security area in operation 1660. For example, the electronic device may blur at least part of the written object. In another example, the electronic device may process at least part of the written object not to be seen from a different angle for security. In another example, the electronic device may lock or store at least part of the written object such that the at least part of the written object cannot be modified. However, this should not be considered as limiting, and the electronic device may secure the object in various methods according to user settings.

Figure 18:
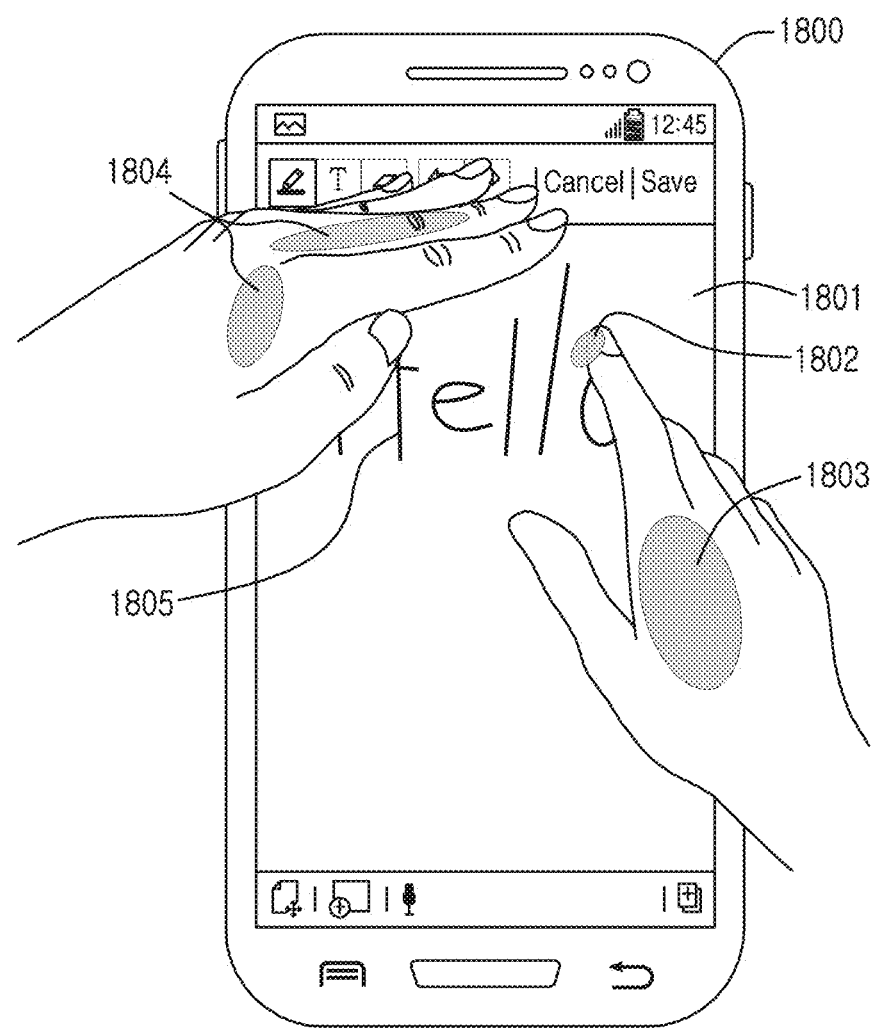
FIG. 18 illustrates a view of a method for setting a security area based on a palm touch according to an embodiment of the present disclosure.

FIG. 18 illustrates a view of a method for setting a security area based on a palm touch according to an embodiment of the present disclosure.

According to various embodiments of the present disclosure, the case in which the writing is input by using the input pen has been described. However, this should not be considered as limiting. For example, when writing is input by using a finger, an electronic device 1800 may detect a finger touch 1802 and a palm touch 1803 for inputting writing in an application 1801 which is capable of inputting writing, as shown in FIG. 18. In addition, the electronic device 1800 may detect a palm touch 1804 by the left hand, and, when the palm touch 1804 by the left hand corresponds to a written object 1805, the electronic device 1800 may set at least part of the displayed object 1805 as a security area.

Figure 19:
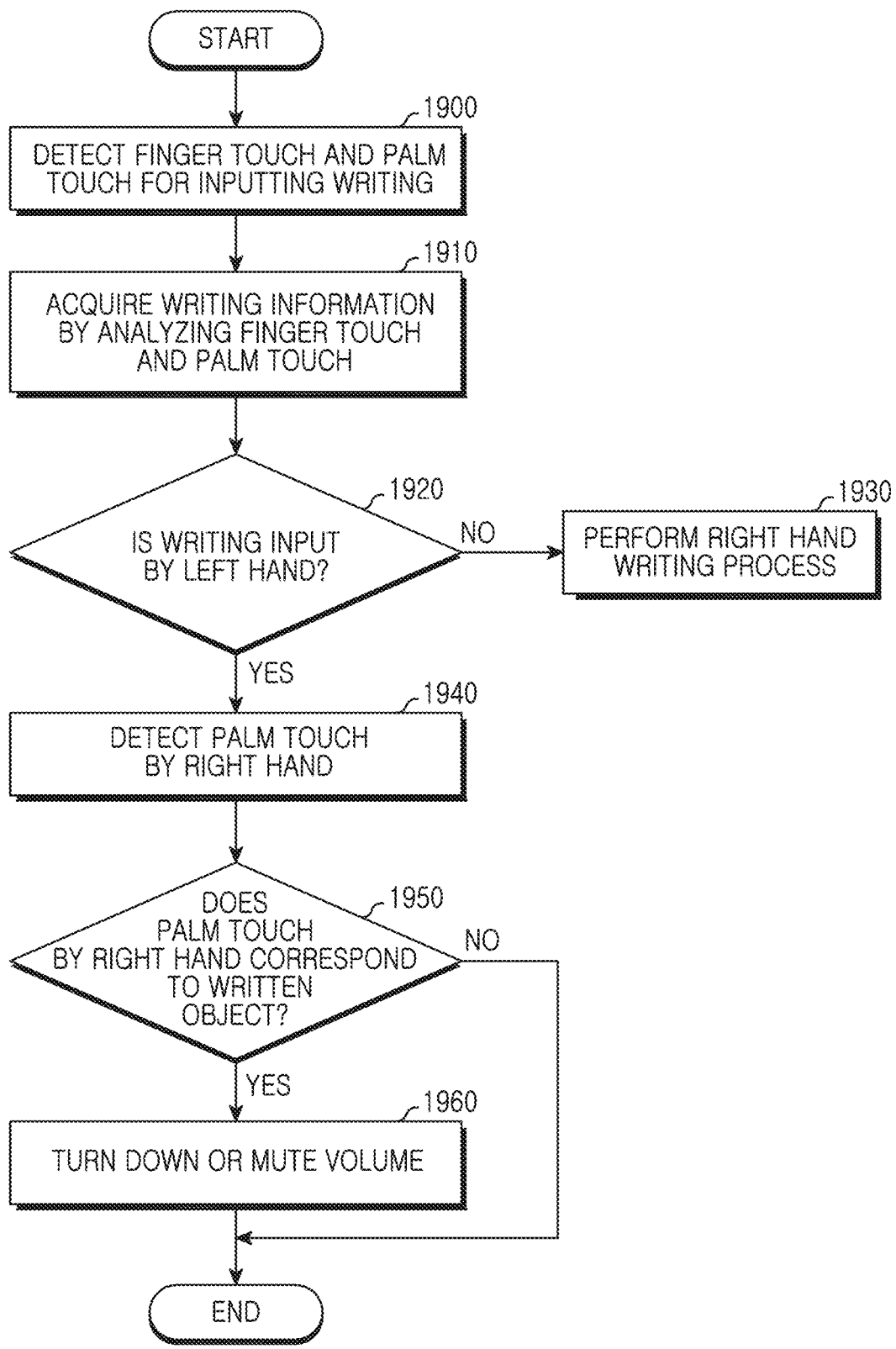
FIG. 19 illustrates a view flowchart of a procedure for adjusting a sound volume based on a palm touch according to an embodiment of the present disclosure.

FIG. 19 illustrates a view flowchart of a procedure for adjusting a sound volume based on a palm touch according to an embodiment of the present disclosure.

Figure 20:
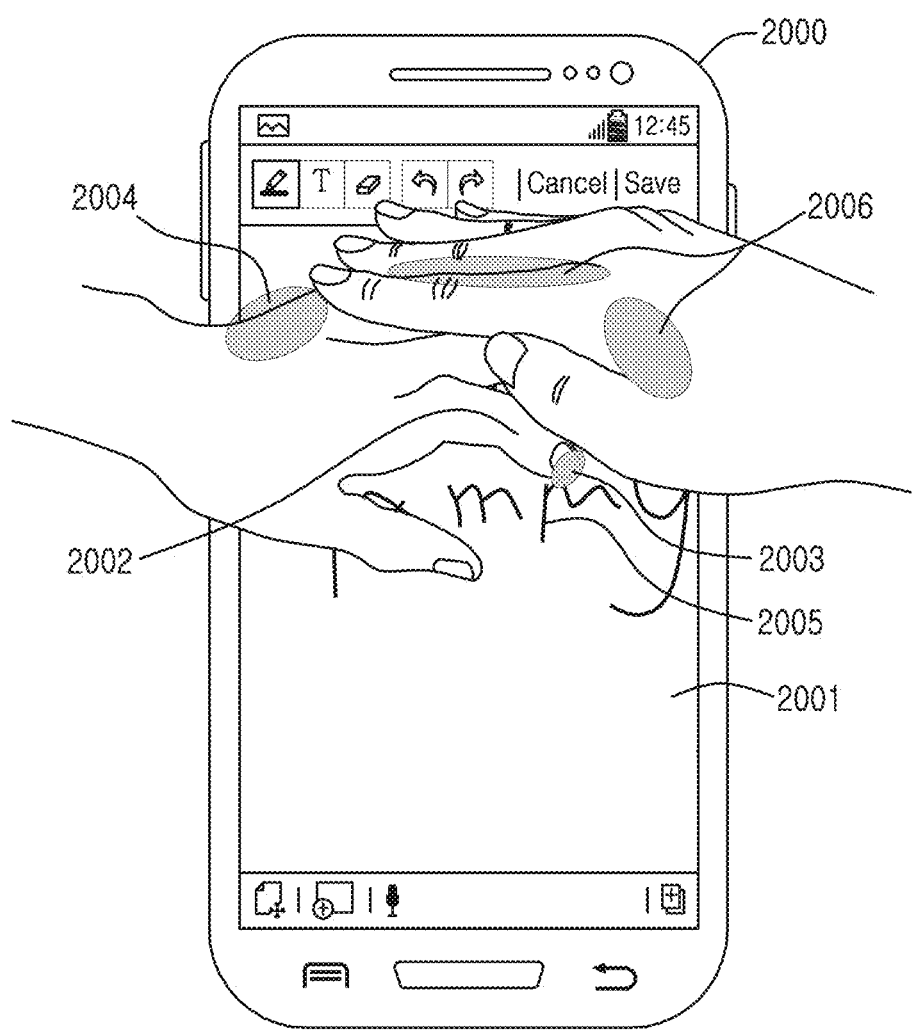
FIG. 20 illustrates a view of a method for adjusting a sound volume based on a palm touch according to an embodiment of the present disclosure.

FIG. 20 illustrates a view of a method for adjusting a sound volume based on a palm touch according to an embodiment of the present disclosure Referring to FIG. 19, in operation 1900, the electronic device may detect a finger touch and a palm touch for inputting writing. For example, referring to FIG. 20, an electronic device 2000 may detect a finger touch 2003 by a finger 2002 and a palm touch 2004 by a palm through a touch screen in a state in which an application 2001 capable of inputting writing (e.g., a memo application, a message creation application, and the like) is executed. According to an embodiment of the present disclosure, the electronic device 2000 may distinguish between the finger touch 2003 and the palm touch 2004, and may display various objects 2005 such as points, lines, characters, figures, and the like according to the detected finger touch 2003.

In operation 1910, the electronic device may acquire writing information by analyzing the finger touch and the palm touch. According to an embodiment of the present disclosure, when the user inputs writing using user's finger, the electronic device may detect the movement, pressure, and rotation angle, and the like of the finger touch. In addition, the electronic device may detect the touch area and the touch shape of the palm touch detected when the user inputs writing using user's finger. For example, the electronic device may detect a writing direction by analyzing the acquired finger touch information and palm touch information, and may determine whether the user writes with the user's right hand or left hand.

In operation 1920, the electronic device may determine whether the writing is input by the left hand or not. According to an embodiment of the present disclosure, the electronic device may determine whether the writing is input by the right hand or left hand based on the acquired writing information.

When the writing input is not by the left hand (when the writing input is by the right hand), the electronic device may perform a right hand writing process in operation 1930. For example, a right hand writing process and a left hand writing process may be set respectively.

When the writing input is by the left hand, the electronic device may detect a palm touch by the right hand in operation 1940. For example, the user may place the user's right hand on the screen of the electronic device as a gesture for protecting user's privacy. According to an embodiment of the present disclosure, the user may hide a part of the screen using the user's palm as a gesture for hiding the objects 2005 displayed on the currently executed application 2001 as shown in FIG. 20. In this case, the electronic device 2000 may detect a palm touch (area) 2006 by the palm of the right hand. For example, the electronic device 2000 may recognize the palm touch 2006 when a touch greater than or equal to a reference area is detected. In another example, the electronic device 2000 may recognize the palm touch 2006 when the touch greater than or equal to the reference area is detected for a time greater than or equal to a reference time. However, this should not be considered as limiting, and the palm touch may be defined according to various criteria.

In operation 1950, the electronic device may determine whether the palm touch by the right hand corresponds to a written object or not. According to an embodiment of the present disclosure, as shown in FIG. 20, the electronic device 2000 may determine whether the palm touch area 2006 by the right hand overlap the displayed objects 2005 or not. According to an embodiment of the present disclosure, the electronic device 2000 may determine whether the palm touch area 2006 by the right hand is located within a reference distance from the displayed objects 2005. According to an embodiment of the present disclosure, the electronic device 2000 may determine whether the palm touch area 2006 by the right hand is located within an area designated on the screen.

When the palm touch by the right hand corresponds to the written object, the electronic device may turn down or mute the sound volume in operation 1960. According to an embodiment of the present disclosure, the electronic device 2000 may turn down or mute the volume generated by the input of the writing in the currently executed application 2001 as shown in FIG. 20. According to an embodiment of the present disclosure, the electronic device 2000 may change a current sound output mode to a vibrate mode or a silent mode. However, this should not be considered as limiting, and the electronic device 2000 may adjust the volume in various methods according to user settings.

Figure 21:
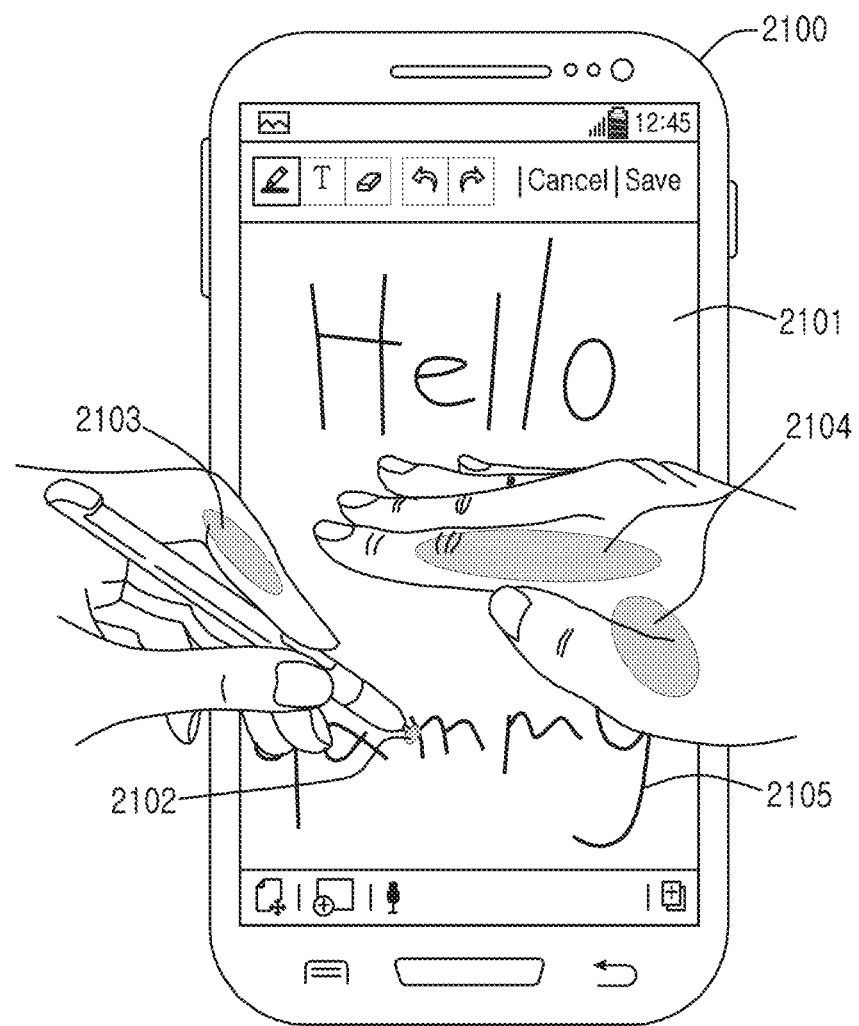
FIG. 21 illustrates a view of a method for adjusting a sound volume based on a palm touch according to an embodiment of the present disclosure.

FIG. 21 illustrates a view of a method for adjusting a sound volume based on a palm touch according to an embodiment of the present disclosure.

Referring to FIG. 21, the case in which the writing is input by using the finger has been described. However, this should not be considered as limiting. For example, when writing is input by using an input pen, an electronic device 2100 may detect a pen touch 2102 and a palm touch 2103 for inputting writing in an application 2101 which is capable of inputting writing as shown in FIG. 21. In addition, the electronic device 2100 detects a palm touch 2104 by the right hand, and, when the palm touch 2104 by the right hand corresponds to a written object 2105, the electronic device 2100 may turn down or mute the volume generated by the input of the writing in the currently executed application 2101.

According to various embodiments of the present disclosure, a method for operating of an electronic device may include detecting a palm touch while performing a first function, and performing a second function according to the detected palm touch.

According to various embodiments of the present disclosure, the first function may include a function which is performed by execution of an application that requires protection of privacy.

According to various embodiments of the present disclosure, the first function may include at least one of a writing input application, a web application, an authentication application, a TTS application, and a multimedia reproduction application.

According to various embodiments of the present disclosure, the second function may include an alternative function which is pre-set to protect privacy.

According to various embodiments of the present disclosure, the second function may include at least one of controlling a display screen, controlling a volume, setting a lock screen, setting a security area, setting an output mode, and executing a specific application.

According to various embodiments of the present disclosure, the palm touch may be detected based on a touch area and a touch time of a touch on a touch screen while the first function is being performed.

According to various embodiments of the present disclosure, the second function may be performed according to whether the palm touch overlaps a content displayed on the touch screen.

According to various embodiments of the present disclosure, the second function may be performed according to whether the palm touch overlaps an object input to the touch screen.

According to various embodiments of the present disclosure, the method may further include detecting a touch input, detecting the palm touch in a state in which the touch input is detected, calculating a distance between the palm touch area and the touch input area, and performing the second function according to a result of the calculating.

According to various embodiments of the present disclosure, the touch input may be a touch input which is performed by a finger or an input pen to input writing.

Figure 22:
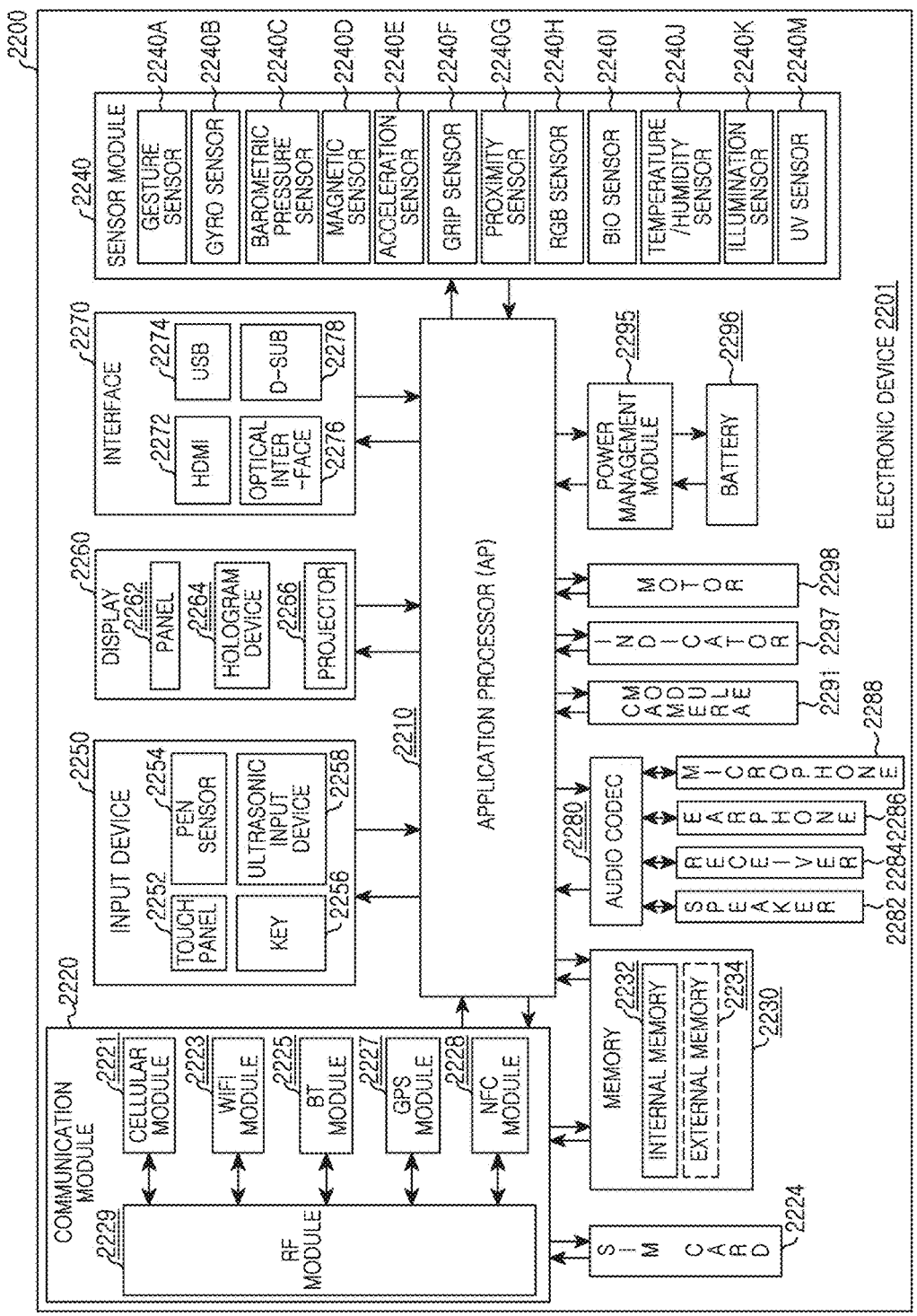
FIG. 22 illustrates a block diagram showing an electronic device according to various embodiments of the present disclosure.

FIG. 22 illustrates a block diagram of an electronic device according to various embodiments of the present disclosure. The electronic device may configure the entirety or part of the electronic device 100 shown in FIG. 1.

Referring to FIG. 22, a block diagram 2200 may include an electronic device 2201. The electronic device 2201 may include one or more Application Processors (APs) 2210, a communication module 2220, a Subscriber Identification Module (SIM) card 2224, a memory 2230, a sensor module 2240, an input device 2250, a display 2260, an interface 2270, an audio module 2280, a camera module 2291, a power management module 2295, a battery 2296, an indicator 2297, and a motor 2298, but is not limited thereto.

The AP 2210 may control a plurality of hardware or software elements connected to the AP 2210 by driving an operating system or an application program, and may process and calculate a variety of data including multimedia data. For example, the AP 2210 may be implemented by using a System on Chip (SoC). According to an embodiment of the present disclosure, the AP 2210 may further include a Graphic Processing Unit (GPU) (not shown).

The communication module 2220 may transmit and receive data via communication between the electronic device 2201 (e.g., the electronic device 100) and other electronic devices (e.g., the other electronic device 104 or the server 106) connected through a network. According to an embodiment of the present disclosure, the communication module 2220 may include a cellular module 2221, a WiFi module 2223, a BT module 2225, a GPS module 2227, an NFC module 2228, and a Radio Frequency (RF) module 2229.

The cellular module 2221 may provide a voice call, a video call, a text service, or an internet service through a telecommunications network (e.g., LTE, LTE-A, CDMA, WCDMA, UMTS, WiBro, GSM, and the like). In addition, the cellular module 2221 may identify and authenticate the electronic device in the telecommunications network by using a SIM (e.g., the SIM card 2224). According to an embodiment of the present disclosure, the cellular module 2221 may perform at least some of the functions provided by the AP 2210. For example, the cellular module 2221 may perform at least some of the multimedia control functions.

According to an embodiment of the present disclosure, the cellular module 2221 may include a Communication Processor (CP). In addition, the cellular module 2221 may be implemented by using an SoC, for example. In FIG. 22, the cellular module 2221 (e.g., the communication processor), the memory 2230, or the power management module 2295 are elements separate from the AP 2210. However, according to an embodiment of the present disclosure, the AP 2210 may be configured to include at least some of the above-described elements (e.g., the cellular module 2221).

According to an embodiment of the present disclosure, the AP 2210 or the cellular module 2221 (e.g., the CP) may load instructions or data received from a non-volatile memory connected therewith or at least one of the other elements into a volatile memory, and may process the instructions or data. In addition, the AP 2210 or the cellular module 2221 may store data which is received from at least one of the other elements or generated by at least one of the other elements in the non-volatile memory.

The WiFi module 2223, the BT module 2225, the GPS module 2227, or the NFC module 2228 each may include a processor for processing data received and transmitted through a corresponding module. In FIG. 22, the cellular module 2221, the WiFi module 2223, the BT module 2225, the GPS module 2227, or the NFC module 2228 is illustrated in a separate block. However, according to an embodiment of the present disclosure, at least some (e.g., two or more) of the cellular module 2221, the WiFi module 2223, the BT module 2225, the GPS module 2227, or the NFC module 2228 may be included in a single integrated chip (IC) or a single IC package. For example, at least some of the processors corresponding to the cellular module 2221, the WiFi module 2223, the BT module 2225, the GPS module 2227, and the NFC module 2228 (e.g., the communication processor corresponding to the cellular module 2221 and the WiFi processor corresponding to the WiFi module 2223) may be implemented by using a single SoC.

The RF module 2229 may transmit and receive data, for example, may transmit and receive an RF signal. Although not shown, the RF module 2229 may include a transceiver, a Power Amp Module (PAM), a frequency filter, or a Low Noise Amplifier (LNA), for example. In addition, the RF module 2229 may further include a part for exchanging electromagnetic waves in a free space in wireless communication, for example, a conductor or conducting wire. In FIG. 22, the cellular module 2221, the WiFi module 2223, the BT module 2225, the GPS module 2227, and the NFC module 2228 share the single RF module 2229 with one another. However, according to an embodiment of the present disclosure, at least one of the cellular module 2221, the WiFi module 2223, the BT module 2225, the GPS module 2227, or the NFC module 2228 may transmit and receive an RF signal through a separate RF module.

The SIM card 2224 may be a card including a SIM, and may be inserted into a slot formed on a specific location of the electronic device. The SIM card 2224 may include unique identification information (e.g., an Integrated Circuit Card Identifier (ICCID)) or subscriber information (e.g., International Mobile Subscriber Identity (IMSI)).

The memory 2230 (e.g., the memory 130) may include an internal memory 2232 or an external memory 2234. For example, the internal memory 2232 may include at least one of a volatile memory (e.g., a Dynamic Random Access Memory (DRAM), a Static RAM (SRAM), a Synchronous DRAM (SDRAM), and the like) and a non-volatile memory (e.g., a One-Time Programmable Read Only Memory (OTPROM), a PROM, an Erasable PROM (EPROM), an Electrically Erasable PROM (EEPROM), a mask ROM, a flash ROM, a NAND flash memory, a NOR flash memory, and the like).

According to an embodiment of the present disclosure, the internal memory 2232 may be a Solid State Drive (SSD). The external memory 2234 may further include a flash drive, for example, Compact Flash (CF), Secure Digital (SD), Micro-SD, Mini-SD, extreme-Digital (xD), a memory stick, and the like. The external memory 2234 may be functionally connected with the electronic device 2201 through various interfaces. According to an embodiment of the present disclosure, the electronic device 2201 may further include a storage device (or a storage medium) such as a hard drive.

The sensor module 2240 may measure a physical quantity or detect an operation state of the electronic device 2201, and may convert measured or detected information into electric signals. The sensor module 2240 may include at least one of a gesture sensor 2240A, a gyro sensor 2240B, a barometric pressure sensor 2240C, a magnetic sensor 2240D, an acceleration sensor 2240E, a grip sensor 2240F, a proximity sensor 2240G, a color sensor 2240H (e.g., Red, Green, Blue (RGB) sensor), a biosensor 2240I, a temperature/humidity sensor 2240J, an illumination sensor 2240K, and an Ultraviolet (UV) sensor 2240M. Additionally or alternatively, the sensor module 2240 may include an E-nose sensor (not shown), an electromyography (EMG) sensor (not shown), an electroencephalogram (EEG) sensor (not shown), an electrocardiogram (ECG) sensor (not shown), an infrared ray (IR) sensor, an iris sensor (not shown), a fingerprint sensor (not shown), and the like. The sensor module 2240 may further include a control circuit to control at least one sensor included therein.

The input device 2250 may include a touch panel 2252, a (digital) pen sensor 2254, a key 2256, or an ultrasonic input device 2258. The touch panel 2252 may recognize a touch input in at least one method of capacitive, resistive, infrared, and ultrasonic methods. In addition, the touch panel 2252 may further include a control circuit (not shown). In the embodiment of a capacitive method, the touch panel 2252 may recognize physical contact or hovering. The touch panel 2252 may further include a tactile layer. In this embodiment, the touch panel 2252 may provide a tactile response to the user.

The (digital) pen sensor 2254 may be implemented in the same or similar method as or to the method of receiving a user's touch input or by using a separate detection sheet. The key 2256 may include a physical button, an optical key, or a keypad. The ultrasonic input device 2258 allows the electronic device 2201 to detect sound waves through a microphone (e.g., a microphone 2288) through an input device generating ultrasonic signals, and is capable of wireless recognition. According to an embodiment of the present disclosure, the electronic device 2201 may receive a user input from an external device connected thereto (e.g., a computer or a server) by using the communication module 2220.

The display 2260 may include a panel 2262, a hologram device 2264, or a projector 2266. For example, the panel 2262 may be a Liquid Crystal Display (LCD) or an Active Matrix Organic Light Emitting Diode (AM-OLED). For example, the panel 2262 may be implemented to be flexible, transparent, or wearable. The panel 2262 may be configured as a single module along with the touch panel 2252. The hologram device 2264 may show a stereoscopic image in the air using interference of light. The projector 2266 may display an image by projecting light onto a screen. The screen may be located inside or outside the electronic device 2201. According to an embodiment of the present disclosure, the display 2260 may further include a control circuit to control the panel 2262, the hologram device 2264, or the projector 2266.

The interface 2270 may include an HDMI 2272, a USB 2274, an optical interface 2276, or D-subminiature (D-sub) 2278. The interface 2270 may be included in the communication interface 160 shown in FIG. 1. Additionally or alternatively, the interface 2270 may include a Mobile High Definition Link (MHL) interface, an SD Card/Multimedia Card (MMC) interface or Infrared Data Association (IrDA) standard interface.

The audio module 2280 may convert a sound and an electric signal bidirectionally. The audio module 2280 may process sound information which is input or output through a speaker 2282, a receiver 2284, an earphone 2286, or the microphone 2288.

The camera module 2291 is a device for photographing a still image and a moving image, and, according to an embodiment of the present disclosure, the camera module 2291 may include one or more image sensors (e.g., a front surface sensor or a rear surface sensor), a lens (not shown), an Image Signal Processor (ISP) (not shown), or a flash (memory) (e.g., an LED or a xenon lamp).

The power management module 2295 may manage power of the electronic device 2201. Although not shown, the power management module 2295 may include a Power Management IC (PMIC), a charging IC, or a battery or fuel gage. For example, the PMIC may be mounted in an integrated circuit or an SoC semiconductor.

The charging method may be divided into a wire charging method and a wireless charging method. The charging IC may charge a battery and may prevent inflow of overvoltage or over current from a charger. According to an embodiment of the present disclosure, the charging IC may include a charging IC for at least one of the wire charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gage may measure a remaining battery life of the battery 2296, a voltage, a current, or temperature during charging. The battery 2296 may store or generate electricity and may supply power to the electronic device 2201 by using stored or generated electricity. The battery 2296 may include a rechargeable battery or a solar battery.

The indicator 2297 may display a specific state of the electronic device 2201 or a part of the specific state (e.g., the AP 2210), for example, a booting state, a message state, or a charging state. The motor 2298 may convert an electric signal into a mechanical vibration. Although not shown, the electronic device 2201 may include a processing device (e.g., a GPU) for supporting a mobile TV. The processing device for supporting the mobile TV may process media data according to standards such as DMB, Digital Video Broadcasting (DVB), or media flow.

Each of the above-described elements of the electronic device according to various embodiments of the present disclosure may be comprised of one or more components, and the names of the elements may vary according to the kind of the electronic device. The electronic device according to various embodiments of the present disclosure may include at least one of the above-described elements, and some of the elements may be omitted or an additional element may be further included. In addition, some of the elements of the electronic device according to various embodiments of the present disclosure may be combined into a single entity, and may perform the same functions as those of the elements before being combined.

The term "module" used in various embodiments of the present disclosure refers to a unit including one of hardware, software, and firmware, or a combination of two or more of them, for example. For example, the "module" may be used interchangeably with terms like unit, logic, logical block, component or circuit. The "module" may be a minimum unit of an integrally configured part or a part of the minimum unit. The "module" may be a minimum unit that performs one or more functions or a part of the minimum unit. The "module" may be implemented mechanically or electronically. For example, the "module" according to various embodiments of the present disclosure may include at least one of an Application Specific Integrated Circuit (ASIC) chip, Field Programmable Gate Arrays (FPGAs), and a programmable logic device which perform any operation that is already well known or will be developed in the future.

According to various embodiments of the present disclosure, at least part of the apparatus (e.g., modules or functions) or method (e.g., operations) according to various embodiments of the present disclosure may be implemented by using instructions stored in a computer-readable storage medium in the form of a programming module. When the instructions are executed by one or more processors (e.g., the processor 120), the one or more processors may perform a function corresponding to the instructions. The computer-readable storage medium may be the memory 130, for example. At least part of the programming module may be implemented (e.g., executed) by using the processor 120. At least part of the programming module may include a module, a program, a routine, sets of instructions, a process, and the like for performing one or more functions.

Examples of the computer-readable recording medium include magnetic media such as hard disks, floppy disks and magnetic tapes, optical media such as Compact Disc ROMs (CD-ROMs) and DVDs, magneto-optical media such as floptical disks, and hardware devices such as ROMs, RAMs and flash memories that are especially configured to store and execute program commands (e.g., the programming module). Examples of the program commands include machine language codes created by a compiler, and high-level language codes that can be executed by a computer by using an interpreter. The above-described hardware devices may be configured to operate as one or more software modules for performing operations of various embodiments of the present disclosure, and vice versa.

A module or programming module according to various embodiments of the present disclosure may include one or more of the above-described elements, may omit some elements, or may further include additional elements. The operations performed by the module, the programming module, or the other elements according to various embodiments of the present disclosure may be performed serially, in parallel, repeatedly, or heuristically. In addition, some operation may be performed in different order or may omitted, and an additional operation may be added.

According to various embodiments of the present disclosure, the instructions stored in the storage medium may be set to allow at least one processor to perform at least one operation when the instructions are executed by the at least one processor, and the at least one operation may include: detecting a palm touch while a first function is being performed; and performing a second function according to the detected palm touch.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   detecting a first touch;
   in response to detecting the first touch, displaying at least one object according to the first touch;
   detecting a second touch on a predefined first area while the first touch is detected; and
   in response to detecting the second touch on the predefined first area for a predetermined time, setting, as a security area, a second area comprising at least a part of the at least one object which is displayed according to the first touch, while the second touch on the predefined first area is maintained.

2. The method of claim 1,
   wherein the first touch is performed by a user using a left hand or a right hand, and
   wherein the second touch is performed by the user using the other one of the left hand or the right hand.

3. The method of claim 1, wherein the first touch is detected while performing at least one of a writing input application, a web application, an authentication application, a Text To Speech (TTS) application, and a multimedia reproduction application.

4. The method of claim 1, wherein the setting of the second area comprises blurring the second area comprising the at least the part of the at least one object.

5. The method of claim 1, wherein the setting of the second area comprises locking the second area comprising the at least the part of the at least one object.

6. The method of claim 1,
   wherein the first touch comprises a touch input, and
   wherein the touch input is a touch input which is performed by a finger or an input pen.

7. The method of claim 1, wherein the second touch comprises a palm touch.

8. The method of claim 1,
wherein a distance between the predetermined first area and the second area is smaller than or equal to a reference distance.

9. The method of claim 1, further comprising:
in response to detecting the second touch on the predefined first area for a predetermined time, controlling an operation related to an output of a sound which is occurring by the first touch.

10. An electronic device comprising:
a touch screen; and
a processor configured to:
detect a first touch on the touch screen,
in response to detecting the first touch, control to display at least one object according to the first touch,
detect a second touch on a predefined first area while the first touch is detected, and
in response to detecting the second touch on the predefined first area for a predetermined time while the first touch is detected, set, as a security area, a second area comprising at least a part of the at least one object which is displayed according to the first touch, while the second touch on the predefined first area is maintained.

11. The electronic device of claim 10,
wherein the first touch is performed by a user using a left hand or a right hand, and
wherein the second touch is performed by the user using the other one of the left hand or the right hand.

12. The electronic device of claim 10, wherein the first touch is detected while performing at least one of a writing input application, a web application, an authentication application, a Text to Speech (TTS) application, and a multimedia reproduction application.

13. The electronic device of claim 10, wherein the processor is further configured to blur the second area comprising the at least the part of the at least one object.

14. The electronic device of claim 10, wherein the processor is further configured to lock the second area comprising the at least the part of the at least one object.

15. The electronic device of claim 10, wherein the first touch comprises a touch input, and
wherein the touch input is a touch input which is performed by a finger or an input pen.

16. The electronic device of claim 10, wherein the second touch comprises a palm touch.

17. The electronic device of claim 10, wherein a distance between of predetermined first area and the second area is smaller than or equal to a reference distance.

18. The electronic device of claim 10, wherein the processor is further configured to control an operation related to an output of a sound which is occurring by the first touch in response to detecting the second touch on the predefined first area for a predetermined time.

* * * * *